US011174348B2

(12) United States Patent
Nikbin et al.

(10) Patent No.: US 11,174,348 B2
(45) Date of Patent: Nov. 16, 2021

(54) POLYCARBONATE BASED POLYOLS

(71) Applicant: Dow Global Technologies LLC, Midland, MI (US)

(72) Inventors: Nima N. Nikbin, Lake Jackson, TX (US); David A. Babb, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 211 days.

(21) Appl. No.: 16/327,517

(22) PCT Filed: Nov. 9, 2017

(86) PCT No.: PCT/US2017/060748
§ 371 (c)(1),
(2) Date: Feb. 22, 2019

(87) PCT Pub. No.: WO2018/089566
PCT Pub. Date: May 17, 2018

(65) Prior Publication Data
US 2019/0256652 A1 Aug. 22, 2019

Related U.S. Application Data

(60) Provisional application No. 62/420,918, filed on Nov. 11, 2016, provisional application No. 62/434,664, filed on Dec. 15, 2016.

(51) Int. Cl.
*C08G 64/34* (2006.01)
*C08G 64/02* (2006.01)
(Continued)

(52) U.S. Cl.
CPC .............. *C08G 64/34* (2013.01); *B01J 27/26* (2013.01); *B01J 31/1805* (2013.01);
(Continued)

(58) Field of Classification Search
CPC .. C08G 64/34; C08G 64/0208; C08G 64/205; C08G 64/00; C08G 18/44;
(Continued)

(56) References Cited

U.S. PATENT DOCUMENTS 7,977,501 B2 7/2011 Haider et al.
8,134,022 B2 3/2012 Haider et al.
(Continued)

FOREIGN PATENT DOCUMENTS

EP 2337809 B1 6/2011
EP 2643374 10/2013
(Continued)

OTHER PUBLICATIONS

Subhani, Muhammad Afzal, et. al., "Nanoparticulate TiO2-Supported Double Metal Cyanide Catalyst for the Copolymerization of Co2 with Propylene Oxide," European Journal of Inorganic Chemistry, 2016, p. 1944-1949, Wiley Online Library.

*Primary Examiner* — Shane Fang (57) ABSTRACT

A method of manufacturing a poly(ether-carbonate) polyol comprises a polymerization stage that includes polymerizing carbon dioxide and at least one alkylene oxide, with a starter, in the presence of a double metal cyanide polymerization catalyst and a catalyst promoter that is devoid of halide anions and cyanide. The catalyst promoter is separate from the double metal cyanide polymerization catalyst.

7 Claims, 1 Drawing Sheet

(51) Int. Cl.
*C08G 65/26* (2006.01)
*C08L 69/00* (2006.01)
*B01J 27/26* (2006.01)
*B01J 31/18* (2006.01)
*C08G 64/20* (2006.01)
*C08G 18/44* (2006.01)

(52) U.S. Cl.
CPC ......... *C08G 18/44* (2013.01); *C08G 64/0208* (2013.01); *C08G 64/205* (2013.01); *C08G 65/2603* (2013.01); *C08G 65/2663* (2013.01); *C08L 69/00* (2013.01); *B01J 2531/0238* (2013.01)

(58) Field of Classification Search
CPC .. C08G 65/2603; C08G 65/2663; B01J 27/26; B01J 31/1805; C09D 171/00; C09D 171/02; C09D 171/08
See application file for complete search history.

(56) References Cited

U.S. PATENT DOCUMENTS

| | | | |
|---|---|---|---|
| 8,933,192 B2 | 1/2015 | Gurtler et al. | |
| 9,006,347 B2 | 4/2015 | Williams et al. | |
| 9,040,657 B2 | 5/2015 | Laitar et al. | |
| 9,045,592 B2 | 6/2015 | Gurtler et al. | |
| 9,080,010 B2 | 7/2015 | Wolf et al. | |
| 9,120,894 B2 | 9/2015 | Muller et al. | |
| 9,228,054 B2 | 1/2016 | Muller et al. | |
| 9,273,183 B2 | 3/2016 | Muller et al. | |
| 9,296,859 B2 | 3/2016 | Guertler et al. | |
| 9,315,622 B2 | 4/2016 | Hofmann et al. | |
| 9,382,417 B2 | 7/2016 | Gurtler et al. | |
| 2013/0072602 A1 | 3/2013 | Gurtler et al. | |
| 2013/0289236 A1* | 10/2013 | Laitar ................ | C08G 65/2663 528/412 |
| 2014/0066535 A1 | 3/2014 | Jacobs et al. | |
| 2014/0107245 A1 | 4/2014 | Hofmann et al. | |
| 2015/0299374 A1 | 10/2015 | Hofmann et al. | |

FOREIGN PATENT DOCUMENTS

| | | |
|---|---|---|
| EP | 2997071 A2 | 3/2016 |
| WO | 2009130470 | 10/2009 |
| WO | 2010028362 | 3/2010 |
| WO | 2010062703 | 6/2010 |
| WO | 2012022048 | 2/2012 |
| WO | 2012071505 | 5/2012 |
| WO | 2014184578 A2 | 11/2014 |
| WO | 2015059068 | 4/2015 |
| WO | 2016001206 | 1/2016 |
| WO | 2016012785 | 1/2016 |

* cited by examiner

FIG. 1

POLYCARBONATE BASED POLYOLS

FIELD

Embodiments relate to polycarbonate based polyols, methods of making such polycarbonate based polyols, and polyurethane products prepared using such polycarbonate based polyols.

INTRODUCTION

Polycarbonate based polyols, and efficient methods of preparing such polycarbonate based polyols, are of interest in areas including the area of polyurethanes based polymers. For example, polycarbonate based polyols may be poly (ether-carbonate) polyols that are produced using both one or more alkylene oxides and carbon dioxide, e.g., to make the resultant polyol cheaper and greener. U.S. Pat. No. 9,080,010, discusses a process for the preparation of polyether carbonate polyols by catalytic co-polymerization of carbon dioxide with an alkylene oxide in the presence of one or more H-functional starter substances with the aid of double metal cyanide (DMC) catalysts and in the presence of metal salts (such as metal halides or metal carboxylates). However, such a process disclosed therein may be expensive and require special operating equipment, e.g., due to high operating pressures. Accordingly, improvements are sought.

SUMMARY

Embodiments may be realized by providing a method of manufacturing a poly(ether-carbonate) polyol comprises a polymerization stage that includes polymerizing carbon dioxide and at least one alkylene oxide, with a starter, in the presence of a double metal cyanide polymerization catalyst and a catalyst promoter that is devoid of halide anions and cyanide. The catalyst promoter is separate from the double metal cyanide polymerization catalyst.

DETAILED DESCRIPTION

Figure 1:
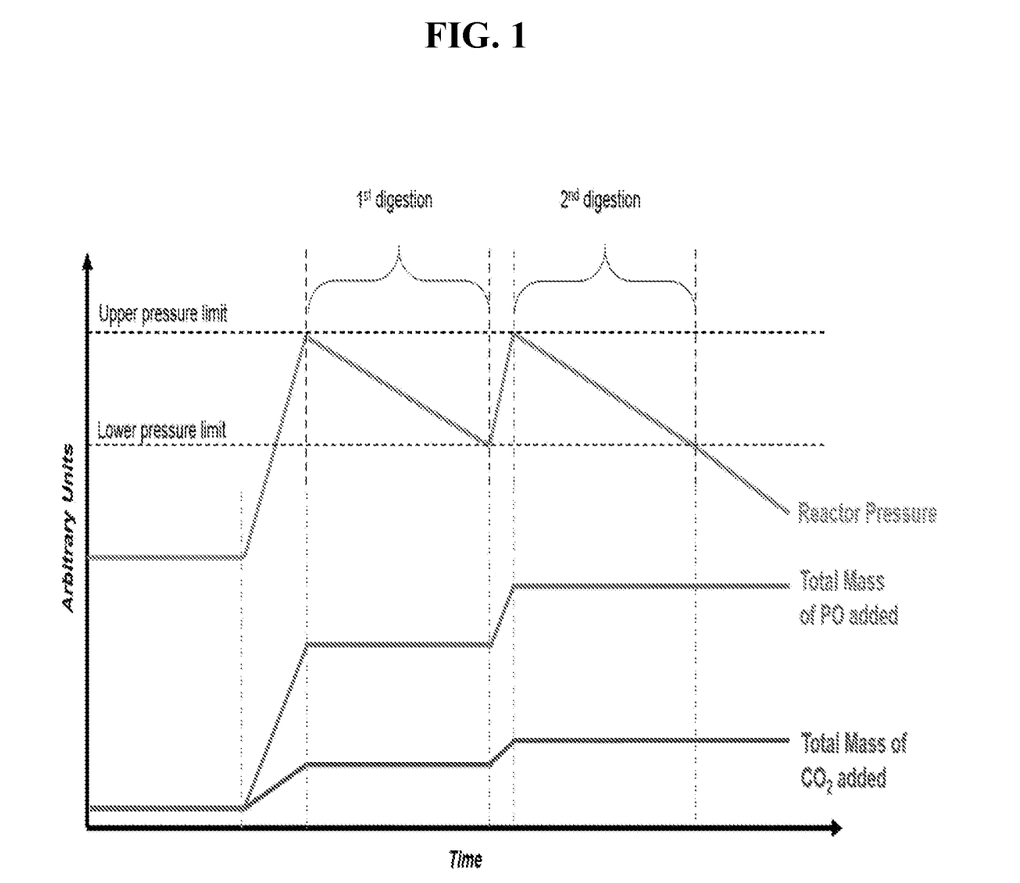
The FIGURE illustrates an exemplary process flow rate chart for an exemplary method of manufacturing a poly (ether-carbonate) polyol.

Polycarbonate based polyols may be prepared using carbon dioxide and/or using both carbon dioxide and an alkylene oxide (such as propylene oxide, ethylene oxide, butylene oxide, and/or combinations thereof). The carbon dioxide may be at least partially in a gaseous phase (e.g., because the reaction may occur at relatively low pressures) and the alkylene oxide may be at least in a liquid phase (may include at least a portion in the gas phase, but to an extent less than the carbon dioxide). The polycarbonate based polyol according to exemplary embodiments may be used to prepare a polyurethane product, which polyurethane product is prepared using an isocyanate component and an isocyanate-reactive component. For example, the polycarbonate based polyol may be included as the only polyol or as one polyol in a blend of two or more polyols in the isocyanate-reactive component. Exemplary polyurethane products include polyurethane foams, polyurethane elastomers, polyurethane coatings, polyurethane sealants, polyurethane adhesives, and polyurethane composite materials. According to embodiments, the polycarbonate based polyols are prepared using a double metal cyanide (DMC) catalyst and a catalyst promoter, in at least two stages, a preliminary stage and a polymerization stage. The preliminary stage may be used for reactor startup prior to the polymerization stage and/or for adding components not in the presence of polymerization conditions prior to starting the polymerization stage.

The exemplary embodiments enable the use of the DMC catalyst as the polymerization catalyst to produce the poly (ether-carbonate) polyol without having to rely on specialized polymerization catalyst structures, e.g., the bimetallic catalyst complexes discussed in International Publication No. WO 2009/130470 or the catalyst formula discussed in International Publication No. WO 2016/012785. For example, in exemplary embodiments, the DMC catalyst may be the sole polymerization catalyst used in the production of the poly(ether-carbonate) polyol. It is believed the catalyst promoter does not directly act as a polymerization catalyst, but acts to enhance the performance of the DMC polymerization catalyst when forming the poly(ether-carbonate) polyol.

The exemplary embodiments may avoid the use of a specific polymerization system that includes a specialized catalyst (having a metal complex including a permanent ligand set and at least one ligand that is a polymerization initiator) used with a specialized chain transfer agent (having a plurality of sites capable of initiating copolymerization of epoxides and $CO_2$), e.g., as discussed in International Publication No. WO 2010/028362. For example, referring to the disclosure in WO 2010/028362, the exemplary embodiments may avoid the use of the specialized chain transfer agent having the structure Y-A-$(Y)_n$ where: each —Y group is independently a functional group capable of initiating chain growth of epoxide $CO_2$ copolymers and each Y group may be the same or different; -A- is a covalent bond or a multivalent moiety; and n is an integer between 1 and 10, inclusive. Whereas, each Y group may be independently selected from the group consisting of: —OH, —C(O)OH, —C(OR$^y$)OH, —OC(R$^y$)OH, —NHR$^y$, —NHC(O)R$^y$, —NHC=NR$^y$; —NR$^y$C=NH; —NR$^y$C(NR$^y{}_2$)=NH; —NHC(NR$^y{}_2$)=NR$^y$; —NHC(O)OR$^y$, —NHC(O)NR$^y{}_2$; —C(O)NHR$^y$, —C(S)NHR$^y$, —OC(O)NHR$^y$, —OC(S) NHR$^y$, —SH, —C(O)SH, —B(OR$^y$)OH, —P(O)$_a$(R$^y$)$_b$ (OR$^y$)$_c$(OX$_f$H, —OP(O)$_a$(R$^y$)$_b$(OR$^y$)$_c$(O)$_{E/}$H, —N(R$^y$)OH, —ON(R$^y$)H, =NOH, =NN(R$^y$)H, where each occurrence of R$^y$ is independently —H, or an optionally substituted radical selected from the group consisting of $C_{1-20}$ aliphatic, $C_{1-20}$ heteroaliphatic, 3- to 12-membered heterocyclic, and 6- to 12-membered aryl, a and b are each independently 0 or 1, c is 0, 1 or 2, d is 0 or 1, and the sum of a, b, and c is 1 or 2 and where an acidic hydrogen atom bound in any of the above functional groups may be replaced by a metal atom or an organic cation.

With respect to preparing poly(ether-carbonate) polyols, DMC catalysts typically strongly promote the polymerization of propylene oxide, and thus can be used to produce high yield poly(propylene oxide) polyols. The DMC catalysts may also be used in the presence of other alkylene oxides, such as ethylene oxide and/or butylene oxide. Further, very low concentrations of the DMC catalyst complex (e.g., less than 25 ppm of the DMC catalyst based on the weight of the product) have in some instances been found to provide commercially acceptable polymerization rates, particularly when the polyether product has a hydroxyl equivalent weight of 800 or more. The ability to perform the polymerization using very low catalyst levels can lead to a very significant reduction in catalyst costs. However, one problem with DMC catalyst is that they sometimes activate slowly, do not activate at all, or may be inactivated in the presence of certain materials. For example, the DMC catalysts may be inactivated in the presence of carbon dioxide. Thus, the stage of introducing carbon dioxide into the polyol may result in low yields and such poly(ether-carbonate) polyol products may be very difficult to produce at an industrial scale. Very little or no polymerization occurs until the catalyst has become activated or after the catalyst has been inactivated, so such long activation times and inactivation have a direct negative impact on the productivity of the process. What is desired is an economical and efficient way to produce these polycarbonate based polyols.

The preparation of polyethers using the DMC catalyst includes a catalyst activation period. During this period, the DMC catalyst is believed to become converted in situ from an inactive form into a highly active form that rapidly polymerizes the alkylene oxide as long as it remains active. This catalyst activation period is typically an indeterminate period of time following the first introduction of alkylene oxide (such as propylene oxide) to the reactor. It is common to introduce a small amount of alkylene oxide at the start of the polymerization process and then wait unit the catalyst has become activated (as indicated, e.g., by a drop in reactor pressure due to the consumption of the initial alkylene oxide charge) before continuing with the alkylene oxide feed.

In the polymerization stage, the alkylene oxide and carbon dioxide are added either in a continuous or step-wise manner, in processes that operate either in continuous or semi-batch operation. The preliminary stage may occur in the presence of starter that includes a mono-alcohol initiator and/or poly-alcohol initiator (such as low molecular weight starter polyol) and may include heating the catalyst with or without the presence of the alkylene oxide and/or carbon dioxide. The catalyst may be activated during the preliminary stage or the polymerization stage, e.g., the catalyst may be activated when propylene oxide is added to the reactor. For example, in semi-batch operations, the catalyst activation stage may occur at least during the preliminary stage, and before the polymerization stage, and may be performed optionally with or without the presence of carbon dioxide in the reactor. In continuous operations, the catalyst activation may at least occur simultaneously with polymerization, as new un-activated catalyst, alkylene oxide, carbon dioxide, and a starter are introduced continuously into the reactor. During the catalyst activation stage, it is believed the catalyst (such as DMC catalyst) is converted in situ from an inactive form into a highly active form that rapidly polymerizes the carbon dioxide and alkylene oxide. According to exemplary embodiments, the polymerization reaction may be sustained by the un-activated catalyst undergoing the activation step in the presence of a low molecular weight polyol and alkylene oxide, despite the presence of the carbon dioxide.

For example, during semi-batch or continuous operations, the catalyst activation period may occur at a first temperature and at least a portion of the polymerization stage may be performed at a second temperature. The first temperature for catalyst activation may be higher or lower than the second temperature for polymerization reaction. For example, the catalyst activation period may occur during the preliminary stage, which includes a heating stage or a cooling stage. The first temperature may be equal to or greater than 50° C., than 120° C., and/or than 150° C. The second temperature may be equal to or greater than 50° C. Both the first temperature and the second temperature may be less than 165° C. For example, the second temperature may be within the range from 50° C. to 165° C. (e.g., from 65° C. to 155° C., from 80° C. to 150° C., and/or from 90° C. to 140° C.). The difference between the first temperature and the second temperature may be at least 10° C., at least 20° C., at least 30° C., at least 40° C., and/or at least 50° C. Optionally, the first temperature and the second temperature may be the same temperature.

According to exemplary embodiments, the formation of polycarbonate based polyols may be observed in the presence of the DMC catalysts and the catalyst promoter, under mild operating conditions. Exemplary DMC catalysts include zinc hexacyanocobaltate catalyst complexes. For example, by mild operation conditions it is meant that the process may be performed in conventional low pressure polyol production equipment, such that specialized equipment for high pressure and/or high temperature operations may not be required. For example, polycarbonate based polyols having a carbonate content from 0.1 wt % to 25 wt % can be prepared in conventional reactors and at high reaction rates with high selectivity, using the process according to exemplary embodiments.

Exemplary pressure operation conditions, for at least one of the stages and/or in all of the stages, for forming the polycarbonate based polyol include pressures that range from 40 psig to 750 psig (e.g., from 80 psig to 150 psig and/or from 100 psig to 140 psig). Other exemplary pressures include from 0.4 MPa to 5.3 MPa (e.g., from 0.7 MPa to 1.1 MPa and/or from 0.8 MPa to 0.9 MPa). During the catalyst activation stage the pressure may range from 0 psig before alkylene oxide addition, up to 750 psig. Under continuous operating conditions the reactor pressure is held constant at a fixed operating process control pressure usually corresponding to pressures between 20 psig and 150 psig.

The resultant polycarbonate based polyols, such as poly (ether-carbonate) polyols, may have a nominal hydroxyl functionality from 2 to 8 (e.g., from 2 to 6 and/or from 2 to 4). The polycarbonate based polyols, such as poly(ether-carbonate) polyols, may have a hydroxyl equivalent weight of from 150 to 4000 g/mol equivalence (e.g., from 200 to 2000 g/mol equivalence and/or from 500 to 1500 g/mol equivalence).

Process Stages

The polyol may be prepared using a batch, semi-batch, and/or continuous process. For example, a semi-batch type process or a continuous addition of starter (i.e., CAOS) type process may be used. DMC is regarded as a more efficient catalyst, e.g., as compared to KOH. Use of the DMC catalyst may allow for the addition of low molecular weight starters to high molecular weight carrier polyols, significantly reduces by-product formation and lowers volatile organic compound formation (low VOCs), and provides a reduction in total energy consumption.

The polymerization stage in the process of forming the polycarbonate based polyols may be performed in the presence of the DMC catalyst and the catalyst promoter, and may exclude any other polyol polymerization catalysts such as potassium hydroxide. This is industrially favorable, e.g., because an important advantage of using DMC catalysts additionally with a catalyst promoter is that the catalyst residues can be left in the product (e.g., because it is present in very low concentrations as compared to other catalyst such as potassium hydroxide). This avoids a costly step of neutralizing and removing a polymerization catalyst such as potassium hydroxide. The polymerization stage includes continued exposure of the reaction mixture to polymerization conditions in the presence of the DMC catalyst and the catalyst promoter to polymerize most or all of the remaining oxides. The amount of unreacted oxides may be reduced in this step to, e.g., less than 2 wt %, less than 1 wt %, and/or less than 0.5 wt %, based on an aggregate weight of the one or more co-feed mixtures.

During the polymerization stage, carbon dioxide and/or an alkylene oxide are fed into the reaction, and optionally the catalyst and/or catalyst promoter may also be added. The carbon dioxide and alkylene oxide may be fed together or may be fed separately. For example, a mixed feed of carbon dioxide and alkylene oxide may be fed into the reaction intermittently (e.g., at predetermined intervals) or continuously (e.g., over a predetermined amount of time) during the polymerization stage. In another example, the carbon dioxide may be fed into the reactor intermittently (e.g., at predetermined intervals) or continuously (e.g., over a predetermined amount of time). Further, independently, the alkylene oxide in a separate feed may be added into the reaction intermittently (e.g., at predetermined intervals) or continuously (e.g., over a predetermined amount of time) during the polymerization stage. In an exemplary embodiment, the carbon dioxide may be fed into a reactor intermittently (e.g., at predetermined intervals based on reactor pressure) and the alkylene oxide (such as propylene oxide) may be feed into the reactor continuously. The addition of carbon dioxide may be continued after the addition of alkylene oxide has ceased, or optionally the addition of alkylene oxide may be continued after the addition of carbon dioxide has ceased. Thereafter, the resulting reaction forms the poly(ether-carbonate) polyol having a backbone that includes both ether groups and carbonate groups. The poly(ether-carbonate) polyol may include primary hydroxyl groups and/or secondary hydroxyl groups.

The polymerization stage may include more than one digestion stage, for which between each digestion stage a different or same feed rate for the carbon dioxide and/or alkylene oxide relative to another digestion stage may be used. In an exemplary embodiment, each digestion stage may start after the addition of the carbon dioxide and/or alkylene oxide has stopped, such that the reaction mixture is digested during the stage. In an exemplary embodiment, one or more digestion stages may include a continuous feed of alkylene oxide, and an intermittent feed of carbon dioxide prior to each digestion stage. For example, the intermittent feed may be varied, such that a higher feed rate of carbon dioxide may be used prior to the first continuous digestion stage and a relatively lower feed rate prior to a subsequent digestion stage, or a lower feed rate of carbon dioxide may be used for the first continuous digestion stage and a relatively higher feed rate during a subsequent digestion stage.

The carbon dioxide and/or an alkylene oxide (separately or as a co-feed mixture) may be added continuously or intermittently during the polymerization stage, under polymerization conditions, to control internal reactor pressures and to control the level of unreacted oxides in the reaction vessel to a reasonable level. For example, the carbon dioxide may be fed on demand during the polymerization stage, by introducing the carbon dioxide as it is consumed, to produce a constant reactor pressure during this stage. Each intermittent addition of carbon dioxide may correspond to the start of a digestion stage, such that as the feed of carbon dioxide is stopped the digestion stage begins. In such an exemplary embodiment, the alkylene oxide may be feed into the reactor at a continuous feed rate, such that a decrease in reactor pressure can be attributed to consumption of the carbon dioxide.

The addition of alkylene oxide to the process may be a single alkylene oxide, a mixture of alkylene oxides, or a feed of a single oxide or mixture of oxides during part of the semi-batch process followed by a feed of a different single oxide or a different mixture of oxides during a different phase of the process. In this manner any combination of single or multiple alkylene oxides may be added to the semi-batch process.

For example, a co-feed mixture of carbon dioxide and alkylene oxide includes 0.5 wt % to 43.0 wt % of carbon dioxide and 57.0 wt % to 99.5 wt % of the alkylene oxide (based on a total weight of the co-feed mixture or said in another way based on the total weight of carbon dioxide and alkylene oxide used to form the polyol), which is polymerized in the presence of the catalyst, catalyst promoter, and the starter. In exemplary embodiment, the amount of incorporation of the carbon dioxide into the poly(ether-carbonate) polyol may be from 1 wt % to 30 wt %, 1 wt % to 25 wt %, 1 wt % to 20 wt %, 1 wt % to 15 wt %, 2 wt % to 15 wt %, 3 wt % to 15 wt %, 3 wt % to 12 wt %, etc., which the remainder being the alkylene oxide.

In exemplary embodiments, the alkylene oxide contains 86 to 100% by weight 1,2-propylene oxide, 0 to 12% by weight ethylene oxide and 0 to 2% by weight of other copolymerizable monomers). For example, the amount of the carbon dioxide relative to alkylene oxide may be different and/or the alkylene oxide used may be different. During the polymerization stage, the respective co-feed mixture is introduced to the reaction under polymerization conditions, whereas co-feed mixture is fed continuously or intermittently and/or at an increasing rate, decreasing rate, or constant rate over a period of time. In exemplary embodiments, the co-feed mixture includes a majority of the alkylene oxide (e.g., at least 50 wt %, at least 60 wt %, at least 70 wt %, at least 75 wt %, at least 79 wt %, etc.), with the remainder being the carbon dioxide. For example, the molar ratio in the co-feed mixture of the carbon dioxide to alkylene oxide may be from 1:1 to less than 1:200 (e.g., from 1:1 to 1:100, from 1:8 to 1:17, from 1.0:1.3 to 1.0:9.0, etc.).

According to an exemplary embodiment using a semi-batch polymerization method, after the preliminary stage, at least the carbon dioxide and alkylene oxide are charged to a reaction vessel, in the presence of the DMC catalyst, catalyst promoter, and starter, and then heated to the second temperature (i.e., the polymerization temperature) until the desired molecular weight is obtained. One way of performing a batch polymerization is to combine the DMC catalyst, catalyst promoter, and starter (optionally in the presence of a polyether having a hydroxyl equivalent weight up to that of the product of the polymerization) at the first temperature during the preliminary stage. Then, the carbon dioxide and/or alkylene oxide are added and the resulting mixture is subjected to polymerization conditions. Additional DMC catalyst and/or catalyst promoter may be added during the course of the carbon dioxide and/or alkylene oxide addition.

In an exemplary semi-batch process, before, after, or during the polymerization stage, the DMC catalyst, catalyst promoter, and starter are combined. A portion of the carbon dioxide and alkylene oxide are introduced into the reaction vessel (e.g., independently continuously or intermittently) and the contents of the vessel are heated (if necessary) to the polymerization temperature. When the DMC catalyst has become activated (typically as indicated by a drop of internal reactor pressure), more carbon dioxide and/or alkylene oxide may be fed to the reactor under polymerization conditions. The feed of the carbon dioxide and/or alkylene oxide is continued until enough has been consumed to reach the target product molecular weight. Additional DMC catalyst and/or catalyst promoter may be added during the course of the carbon dioxide and/or alkylene oxide addition. In the semi-batch process, the entire amount of starter used may be added at the start of the process, or optionally can be added during the polymerization stage. After the feed is completed, the remaining carbon dioxide may be vented off. Optionally, the reaction mixture may be cooked down at the polymerization temperature in an attempt to consume at least some of the remaining alkylene oxide and/or carbon dioxide. For example, the batch and semi-batch processes may be suitable for producing a poly(ether-carbonate) polyol having a hydroxyl equivalent weight of up to 1000, from a starter having a hydroxyl equivalent weight of from 30 to 150. The batch and semi-batch processes may also be used to make polyethers having higher equivalent weights. The poly(ether-carbonate) polyol may be a diol or triol.

In an exemplary continuous polymerization process, during the polymerization stage, there may be continuous addition of the carbon dioxide and/or alkylene oxide, and continuous removal of product. For example, the feed of the alkylene oxide may be continuous, while the carbon dioxide is fed intermittently. A continuous process is generally conducted by establishing steady-state concentrations, within the operational capabilities of the polymerization equipment, of the DMC catalyst, catalyst promoter, starter, carbon dioxide, and alkylene oxide and polymerizate under polymerization conditions in a continuous reactor such as a loop reactor, a tubular or plug-flow reactor or a continuous stirred tank reactor. The "polymerizate" is a mixture of polyethers and/or poly (ethers-carbonates) that have molecular weights greater than that of the starter and up to that of the intended product. Additional DMC catalyst, catalyst promoter, starter, carbon dioxide, and/or alkylene oxide may be continuously added to the reactor, e.g., as a single stream, as separate components, or in various subcombinations. A product stream is continuously withdrawn from the reactor. The rates of the additional stream(s) and product streams are selected to maintain steady-state conditions in the reactor (within the capabilities of the equipment), and to produce a product having a desired molecular weight. The product stream withdrawn from the continuous reactor may be cooked down for some period of time to allow the unreacted alkylene oxide in that stream to be consumed to low levels. For example, continuous process may be particularly suitable for producing a poly(ether-carbonate) product having a hydroxyl equivalent weight from 150 to 5000 (e.g., from 350 to 2500 and/or from 500 to 2000). The poly(ether-carbonate) product may be a diol or triol.

At the start-up of a continuous process, a mixture formed by combining the DMC catalyst, the catalyst promoter, and an initial polymerization starter optionally in the presence of carbon dioxide may be subjected to a preliminary heating step as described before, before being contacted with the alkylene oxide (e.g., during the preliminary stage). In a continuous process, the initial polymerization starter can be a lower molecular weight, a higher molecular weight, or the same molecular weight as the final product. The starter can optionally be identical in composition to the intended final product.

The polymerization reaction can be performed in any type of vessel that is suitable for the pressures and temperatures encountered. In a continuous or semi-continuous process, the vessel should have one or more inlets through which the carbon dioxide and alkylene oxide and additional starter compound can be introduced during the reaction. In a continuous process, the reactor vessel may contain at least one outlet through which a portion of the partially polymerized reaction mixture can be withdrawn. A tubular reactor that has one or multiple points for injecting the starting materials, a loop reactor, and a continuous stirred tank reactor (CTSR) are all suitable types of vessels for continuous or semi-batch operations. The reactor should be equipped with a means of providing or removing heat, so the temperature of the reaction mixture can be maintained within the required range. Suitable means include various types of jacketing for thermal fluids, various types of internal or external heaters, and the like. A cook-down step performed on continuously withdrawn product is conveniently conducted in a reactor that reduces the possibility of and/or prevents significant back-mixing from occurring. Plug-flow operation in a pipe or tubular reactor is an exemplary manner of performing such a cook-down step.

The product obtained in any of the foregoing processes may contain up to 0.5 wt %, based on the total weight, of unreacted carbon dioxide and/or alkylene oxide, small quantities of the starter and low molecular weight alkoxylates thereof, and small quantities of other organic impurities and water. Volatile impurities should be flashed or stripped from the resultant product. The product typically contains catalyst residues and residues of the catalyst promoter. It is typical to leave these residues in the product, but these can be removed if desired. Moisture and volatiles can be removed by stripping the polyol.

A process of producing the poly(ether-carbonate) polyol includes polymerizing the carbon dioxide and at least one alkylene oxide, with the starter, in the presence of the DMC catalyst and the catalyst promoter. For example, the method includes the stages of combining the DMC catalyst, the catalyst promoter, the starter, and optionally a relatively small amount of the alkylene oxide (to activate the DMC catalyst) to form a starting reaction mixture. Then, the starting reaction mixture is heated or cooled to polymerization conditions and the carbon dioxide and a large amount of the alkylene oxide (as needed for the polymerization reaction) are added to the starting reaction mixture. Additional amounts of the DMC catalyst complex, the catalyst promoter, and/or starter may be added to the reactor during the time the carbon dioxide and at least one alkylene oxide are feed.

The carbon dioxide and/or alkylene oxide may be continuously added or intermittently added. In exemplary embodiments, the addition of the carbon dioxide and optionally that of the alkylene oxide may be based on pressure in the reactor. For example, the carbon dioxide may be added in an amount sufficient to increase the pressure in the reactor to a first predetermined pressure that is greater than 60 psig (e.g., greater than 0.41 MPa) and less than 200 psig (e.g., 1.38 MPa). Other exemplary pressures include greater than 100 psig, less than 150 psig, less than 125 psig, etc. Once the first predetermined pressure is reached, the feed of the carbon dioxide may be stopped to allow for a digestion stage to occur thereafter. Once the pressure in the reaction reaches a second predetermined pressure, which is lower than the first predetermined pressure, additional carbon dioxide may be added to perform an additional digestion stage and/or the addition of any additional materials (if any) may by stopped to allow for completion of the polymerization stage (e.g., after one more digestion stage). The second predetermined pressure may be less than the first predetermined pressure by an amount such as 5 psig (e.g., 0.03 MPa), 10 psig (e.g., 0.07 MPa), 15 psig (e.g., 0.10 MPa), 20 psig (e.g., 0.14 MPa), 25 psig (e.g., 0.17 MPa), 30 psig (e.g., 0.20 MPa) etc.

An exemplary method of producing the poly(ether-carbonate) polyol includes (a) establishing steady-state concentrations of (i) the DMC catalyst, (ii) the catalyst promoter, (iii) the starter, (iv) the carbon dioxide, (v) the alkylene oxide, and (vi) the polymerizate in a continuous reactor under polymerization conditions; and (b) continuously adding additional starter, alkylene oxide, DMC catalyst, and catalyst promoter, to the continuous reactor under polymerization conditions and continuously withdrawing a product stream containing poly(ether-carbonate) polyol from the continuous reactor. An exemplary semi-batch process may include adding the starter, DMC catalyst, and catalyst promoter to the reactor, adding an initial charge of alkylene oxide to the reactor to activate the catalyst, then co-feeding the carbon dioxide and the alkylene oxide to the reactor under polymerization conditions. Optionally, the carbon dioxide can be added to the reactor in any proportion before the initial charge of alkylene oxide which is used to activate the catalyst.

The method of producing the poly(ether-carbonate) polyol may include combining the DMC catalyst and the catalyst promoter with an alkylene oxide and at least one initiator compound to form a starting reaction mixture, and then heating the starting reaction mixture to polymerization conditions until the double metal cyanide catalyst complex becomes activated and then feeding additional alkylene oxide and the carbon dioxide to the starting reaction mixture under polymerization conditions. In exemplary embodiments, a preliminary stage may include, adding carbon dioxide and subsequently venting the added carbon dioxide, in order to prepare the reactor for the polymerization stage.

During the preliminary stage, a preliminary heating step may be performed by heating the DMC catalyst and catalyst promoter to a temperature of from 80° C. to 220° C. at atmospheric or sub-atmospheric pressure for a period of 10 minutes or more prior to adding the carbon dioxide and alkylene oxide.

Starter

The starter may include a mono-alcohol initiator and/or a poly-alcohol initiator (such as a low molecular weight starter polyether polyol). It is possible to perform the polymerization in the presence of a starter that includes a mixture of the mono-alcohol initiator and low molecular weight starter polyol. The result of such a polymerization may be a poly(ether-carbonate) mixture containing monols and polyols.

The mono-alcohol initiator may have a hydroxyl equivalent weight of from 30 to 1000. The poly-alcohol initiator may have a hydroxyl equivalent weight of 3,000 g/mol or less (e.g., 1,500 g/mol or less).

For example, the mono-alcohol initiator may have at least one aliphatic carbon-carbon double bond, said carbon dioxide and alkylene oxide being polymerized onto starter during the one or more digestion stages. The carbon-carbon double bond may be, e.g., vinyl ($CH_2$=CH—), allylic ($CH_2$=CH—$CH_2$—) or propenyl ($CH_3$—CH=$CH_2$—) unsaturation. The unsaturated monoalcohol may contain, for example, up to 30 carbon atoms, up to 20 carbon atoms or up to 12 carbon atoms. Examples of unsaturated alcohols include vinyl alcohol, 1-propen-3-ol, 1-buten-4-ol, 1-hexen-6-ol, 1-heptene-7-ol, 1-octen-8-ol, 1-nonen-9-ol, 1-decen-10-ol, 1-undecen-11-ol, 1-dodecen-12-ol, allyl alcohol, hydroxyethylacrylate, hydroxypropylacrylate, hydroethylmethacrylate, and the like, as well as alkoxylates of any of the foregoing having molecular weights of up to 1000 (e.g., up to 500). Any two or more of the foregoing may be used.

Exemplary poly-alcohol starters include ethylene glycol, diethylene glycol, triethylene glycol, propylene glycol, dipropylene glycol, tripropylene glycol, glycerin, trimethylolpropane, pentaerythritol, sucrose, sorbitol, and alkoxylates, of any combinations thereof having a hydroxyl equivalent weight of up to 1000.

Low molecular weight polyol starters includes two or more hydroxyl groups, and exemplary starters include polyols alkoxylated with ethylene oxide, propylene oxide and/or butylene oxide in any relative proportion. At least one other reactive oxirane may also be used singularly or included along with the more standard oxiranes list above, such as styrene oxide, epichlorohydrin, octene oxide, and allyl glycidyl ether.

The polymerization reaction for forming poly(ether-carbonate) polyol may be characterized by the "build ratio", which is defined as the ratio of the number average molecular weight of the polyether product to that of the starter. This build ratio may be as high as 160. Exemplary embodiments include a range from 2 to about 65 (e.g., 2 to 50, 2 to 15, 7 to 11, etc.) For example, during the polymerization stage, the starter may constitutes 0.5 wt % to 90.0 wt % of the weight of the poly(ether-carbonate) polyol forming mixture.

Catalyst

The polymerization catalyst is a double metal cyanide catalyst complex, also referred to herein as DMC catalyst. Exemplary DMC catalysts include those described, e.g., in U.S. Pat. Nos. 3,278,457; 3,278,458; 3,278,459; 3,404,109; 3,427,256; 3,427,334; 3,427,335; and 5,470,813.

Exemplary DMC catalysts can be represented by the Formula 1:

$$M_b[M^1(CN)_r(X)_t]_c[M^2(X)_6]d \cdot nM^3{}_xA_y \qquad \text{Formula 1}$$

wherein M and $M^3$ are each metals; $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3{}_xA_y$, and n is zero or a positive integer. The foregoing formula does not reflect the presence of neutral complexing agents such as t-butanol which are often present in the DMC catalyst complex. In exemplary embodiments, r is 4 or 6, t is 0. In some instances, r+t will equal six.

For example, M and $M^3$ may each be a metal ion independently selected from the group of $Zn^{2+}$, $Fe^{2+}$, $Co^{+2+}$, $Ni^{2+}$, $Mo^{4+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$ and $Cr^{3+}$. $M^1$ and $M^2$ may each be selected from the group of $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$. Among the foregoing, those in the plus-three oxidation state may be used as the $M^1$ and $M^2$ metal (e.g., $Co^{+3}$ and $Fe^+$). Suitable anions A include, but are not limited, to halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate) and a $C_{1-4}$ carboxylate.

An exemplary type of DMC catalyst is a zinc hexacyanocolbaltate complexed with t-butanol.

According to exemplary embodiments, the DMC catalyst performs in the presence of carbon dioxide and/or when the concentration of hydroxyl groups is high during the digestion/polymerization process, activating rapidly and providing good polymerization rates without deactivating prematurely. The process of manufacturing using the DMC catalyst is amenable to the production of such polycarbonate polyols, such as poly(ether-carbonate polyols) having hydroxyl equivalent weights of from 150 to 5,000 or more. In addition, the process provides a method by which the carbon dioxide and/or alkylene oxide can be polymerized onto a low equivalent weight starter such as propylene glycol, glycerin, trimethylol propane, sorbitol, sucrose, low molecular weight alkoxylates of these initiators, or combinations thereof.

Promoter

Catalyst deactivation (such as for the DMC catalyst) may occur in the presence of high concentration of hydroxyl groups. For example, alkoxylation of initiators may not easily proceed directly from a low molecular weight mono-alcohol or poly alcohol initiator to the finished polyol, because the high concentration of hydroxyl groups and initiator compound during early stages of the polymerization may severely inhibit initial catalyst activation. Therefore, it is proposed to produce the polycarbonate based polyol, comprising polymerizing of carbon dioxide and at least one alkylene oxide in the presence of the DMC catalyst (as the polymerization catalyst) and a catalyst promoter. The catalyst promoter is separate from the DMC catalyst, e.g., is not a ligand on a catalyst and may be separately added to a reaction mixture. In exemplary embodiments, the catalyst promoter may be devoid of halide anions. The catalyst promoter may be devoid of cyanide. In exemplary embodiments, the catalyst promoter may be devoid of any organic phenols, such as phenols that do not additionally include a magnesium, a Group 3-Group 15 metal, or a lanthanide series compound. In exemplary embodiments, the catalyst promoter may be devoid of zinc ions, such that the catalyst promoter includes a Group 3-Group 15 metal, other than zinc.

For example, the catalyst promoter is a magnesium, a Group 3-Group 15 metal, or a lanthanide series compound in which the magnesium, Group 3-Group 15 metal, or lanthanide series metal is bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion, and wherein the magnesium, Group 3-Group 15, or lanthanide series metal compound is devoid of halide anions. Exemplary promoters are discussed in U.S. Pat. No. 9,040,657. In exemplary embodiments, use of Group 3-Group 15 metal, or lanthanide series metal bonded to a carboxylate may be avoided.

With use of the catalyst promoter, an exemplary method for producing the polycarbonate based polyol includes, prior to and/or during at least one of the one or more digestion/polymerization stages, the following (1) forming a catalyst mixture by combining (a) the DMC catalyst and (b) the catalyst promoter, which is the magnesium, Group 3-Group 15 metal, or lanthanide series metal compound in which the magnesium, Group 3-Group 15 metal, or lanthanide series metal compound is bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion, and wherein the magnesium, Group 3-Group 15 metal, or lanthanide series metal compound is devoid of halide anions; (2) combining the catalyst mixture with a feed that includes carbon dioxide and/or an alkylene oxide; and (3) polymerizing the carbon dioxide and/or alkylene oxide.

An exemplary method of producing the polycarbonate based polyol, such as the poly(ether-carbonate) polyol, includes polymerizing both carbon dioxide and the alkylene oxide in the presence of the DMC catalyst and a magnesium, Group 3-Group 15 metal, or lanthanide series compound in which the magnesium, Group 3-Group 15 metal, or lanthanide series metal is bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion, and wherein the magnesium, Group 3-Group 15, or lanthanide series metal compound is devoid of halide anions.

In exemplary embodiments, it is believed the presence of the catalyst promoter, e.g., magnesium, Group 3-Group 15 metal, or lanthanide series metal compound (sometimes referred to herein as "MG3-15LA compound") may significantly reduce the time required to activate the DMC catalyst, compared to when the DMC catalyst is used by itself (e.g., when the MG3-15LA compound is absent). After the DMC catalyst has become activated, faster polymerization rates may be seen, compared to when the DMC catalyst is used by itself (e.g., when the MG3-15LA compound is absent). Also, certain promoter metals appear to provide especially fast polymerization rates.

The catalyst promoter, e.g., MG3-15LA compound, is a separately added ingredient, which is not present during the preparation (i.e., the precipitation step) of the DMC catalyst. The MG3-15LA compound contains a magnesium, Group 3-Group 15 metal, or lanthanide series metal ion bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion. The catalyst promoter is devoid of halide anions. The catalyst promoter is devoid of cyanide.

By alkoxide anion it is meant a species having the form $^-$O—R, where R is an alkyl group or substituted alkyl group, and which is the conjugate base, after removal of a hydroxyl hydrogen, of an alcohol compound having the form HO—R. These alcohols typically have pKa values in the range of 13 to 25 or greater. The alkoxide ion may contain from 1 to 20 (e.g., from 1 to 6 and/or from 2 to 6) carbon atoms. The alkyl group or substituted alkyl group may be linear, branched, and/or cyclic. Examples of suitable substituents include, e.g., additional hydroxyl groups (which may be in the alkoxide form), ether groups, carbonyl groups, ester groups, urethane groups, carbonate groups, silyl groups, aromatic groups (such as phenyl and alkyl-substituted phenyl), and halogen. Examples of such alkoxide ions include methoxide, ethoxide, isopropoxide, n-propoxide, n-butoxide, sec-butoxide, t-butoxide, benzyloxy, and the like. In other embodiments, the R group may contain one or more hydroxyl groups and/or may contain one or more ether linkages. An alkoxide ion may correspond to the residue (after removal of one or more hydroxyl hydrogens) of an initiator compound that is present in the polymerization, such as those initiator compounds described below. The alkoxide ion may be an alkoxide formed by removing one or more hydroxyl hydrogens from a polyether monol or polyether polyol.

By aryloxy anion it is meant a species having the form —O—Ar, where Ar is an aromatic group or substituted group, and which corresponds, after removal of a hydroxyl hydrogen, to a phenolic compound having the form HO—Ar. These phenolic compounds may have a pKa of, e.g., from 9 to 12. Examples of such aryloxy anions include phenoxide and ring-substituted phenoxides, whereas the ring-substituents include, e.g., alkyl, $CF_3$, cyano, $CH_3$ $COCH_3$, halogen, hydroxyl, alkyl, alkoxyl, and the like. The ring-substituent(s), if present, may be in one or more of the ortho-, para- and/or meta-positions relative to the phenolic group. The phenoxide anions also include the conjugate bases of polyphenolic compounds such as bisphenol A, bisphenol F and various other bisphenols, 1,1,1-tris(hydroxyphenyl)ethane, and fused ring aromatics such as 1-naphthol and the like.

By carboxylate anion it is meant a carboxylate having from 1 to 24 (e.g., from 2 to 18 and/or from 2 to 12) carbon atoms. It may be aliphatic or aromatic. An aliphatic carboxylic acid may contain substituent groups such as hydroxyl groups (which may be in the alkoxide form), ether groups, carbonyl groups, ester groups, urethane groups, carbonate groups, silyl groups, aromatic groups such as phenyl and alkyl-substituted phenyl, halogen, and the like. Examples of aliphatic carboxylate anions include formate, acetate, propionate, butyrate, 2-ethylhexanoate, n-octoate, decanoate, laurate and other alkanoates and halogen-substituted alkanoates such as 2,2,2-trifluoroacetate, 2-fluoroacetate, 2,2-difluoroacetate, 2-chloroacetate, 2,2,2-trichloroacetate and the like. Aromatic carboxylates include benzoate, alkyl-substituted benzoate, halo-substituted benzoate, 4-cyanobenzoate, 4-trifluoromethylbenzoate, salicylate, 3,5-di-t-butylsalicylate, subsalicylate, and the like. In some embodiments, such a carboxylate ion may be the conjugate base of a carboxylic acid having a pKa from 1 to 6 (e.g., from 3 to 5).

By acyl anion, it is meant a conjugate base of a compound containing a carbonyl group including, e.g., an aldehyde, ketone, carbonate, ester or similar compound that has an enol form. Among these are β-diketo compounds, such as acetoacetonate, butylacetoacetonate and the like.

Phosphate ester anions include those having the formula —O—P(O)(OR$^1$)$_2$, wherein R is alkyl, substituted alkyl, phenyl or substituted phenyl. Thiophosphate esters have the corresponding structure in which one or more of the oxygens are replaced with sulfur.

By amide anion, it is meant an ion in which a nitrogen atom bears a negative charge. The amide ion generally takes the form —N(R$^2$)$_2$, wherein the R$^2$ groups are independently hydrogen, alkyl, aryl, trialkylsilyl, triarylsilyl, and the like. The alkyl groups may be linear, branched or cyclic. Any of these groups may contain substituents such as ether or hydroxyl. The two R$^2$ groups may together form a ring structure, which ring structure may be unsaturated and/or contain one or more heteroatoms (in addition to the amide nitrogen) in the ring.

Hydrocarbyl anions include aliphatic, cycloaliphatic, and/or aromatic anions, whereas the negative charge resides on a carbon atom. The hydrocarbyl anions are conjugate bases of hydrocarbons that typically have pKa values in excess of 30. The hydrocarbyl anions may also contain inert substituents. For example, of the aromatic hydrocarbyl anions, phenyl groups, and substituted phenyl groups may be ussed. Aliphatic hydrocarbyl anions may be alkyl groups (e.g., containing from 1 to 12 and/or from 2 to 8 carbon atoms). Methyl, ethyl, n-propyl, isopropyl, n-butyl, sec-butyl, isobutyl, cyclopentadienyl, and t-butyl anions may be useful.

In exemplary embodiments, the anions are the conjugate base of a compound having a pKa of at least 1.5 (e.g., at least 2.5 and/or at least 3.0). For example, shorter activation times may be seen when the anions correspond to the conjugate base of a compound having a pKa of at least 9 (e.g., at least 12 and/or at least 13). The anion may be the conjugate base of a compound having any higher pKa, such as up to 60 or higher. Anions corresponding to the conjugate base of a compound having a pKa of less than 9 (e.g., less than 5), may lead to longer activation times. Exemplary anions that may be used are alkoxide, aryloxy, amide, acetylacetonate, and hydrocarbyl anions, which are the conjugate base of a compound having a pKa of at least 9 (e.g., at least 12, at least 13, and/or up to 60).

The Group 3-Group 15 metals are metals falling within any of Groups III through 15, inclusive, of the 2010 IUPAC periodic table of the elements. The metal may be, e.g., scandium, yttrium, lanthanum, titanium, zirconium, hafnium, vanadium, niobium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, aluminum, gallium, indium, tellurium, germanium, tin, lead, antimony, bismuth, and the lanthanide series metals including those having atomic numbers from 58 (cerium) to 71 (lutetium), inclusive. Exemplary metals that may be used include those in Groups 3, 4, 5, 12, 13 and 14. Among these, scandium, yttrium, hafnium, titanium, zirconium, niobium, vanadium, zinc, aluminum, gallium, indium and tin are usable in exemplary embodiments, as these metals may tend to provide fast polymerization rates and/or allow very small quantities of the DMC catalyst to be present. For example, Aluminum, zinc, hafnium, gallium, indium, tin, titanium and/or zirconium may be used.

Exemplary promoters are compounds corresponding to either of the formula M$^4$A$^1_z$ and M$^4$(O)A$^1_z$, wherein M$^4$ is the magnesium, Group 3-Group 15, or lanthanide series metal and each A$^1$ is independently an anion as described before and z is a number of at least one which reflects an electrostatically neutral compound, provided that any two or more A$^1$ groups may together form a polyvalent group. Each A$^1$= is independently an alkoxide, aryloxy anion, amide anion or hydrocarbyl anion that is the conjugate base of a compound having a pKa of at least 9 (e.g., at least 12 and/or at least 13). Any A$^1$ may be an alkoxide anion, which is the conjugate base of an initiator compound or a polyether monol or polyether polyol, including the polyether monol or polyether polyol product that is obtained from the alkoxylation reaction or a polyether having a molecular weight intermediate to that of the initiator compound and the product of the alkoxylati on reaction.

The promoter compound may be devoid of anions that are conjugate bases of inorganic acids such as sulfate, sulfite, persulfate, nitrate, nitrite, chlorate, perchlorate, hypochlorite, carbonate, chromate, and the like; sulfonate anions such as trifluoromethylsulfonate and methyl sulfonate; and hydroxide ions.

Examples of promoters include:

a) magnesium alkyls such as diethyl magnesium, dibutyl magnesium, butylethyl magnesium, dibenzyl magnesium and the like; magnesium alkoxides such as magnesium methoxide, magnesium ethoxide, magnesium isopropoxide, magnesium t-butoxide, magnesium sec-butoxide and the like; magnesium aryloxides such as magnesium phenoxide, and magnesium phenoxides in which one or more of the phenoxide groups is ring-substituted with alkyl, CF$_3$, cyano, COCH$_3$, halogen, hydroxyl, alkoxyl and the like; magnesium carboxylates such as magnesium formate, magnesium acetate, magnesium propionate, magnesium 2-ethylhexanoate, magnesium benzoate, magnesium benzoates in which one or more of the benzoate groups is ring-substituted with alkyl, CF$_3$, cyano, COCH$_3$, halogen, hydroxyl, alkoxyl and the like, magnesium salicylate, magnesium 3,5-di-t-butyl salicylate; magnesium amides such as magnesium dimethylamide, magnesium diethylamide, magnesium diphenylamide, magnesium bis(trimethylsilyl)amide and the like; magnesium acetylacetonate and magnesium t-butylacetylacetonate.

b) scandium alkoxides such as scandium methoxide, scandium ethoxide, scandium isopropoxide, scandium t-butoxide, scandium sec-butoxide and the like; scandium aryloxides such as scandium phenoxide and scandium phenoxides in which one or more of the phenoxide groups is ring-substituted with alkyl, $CF_3$, cyano, $COCH_3$, halogen, hydroxyl, alkoxyl and the like; scandium carboxylates such as scandium formate, scandium acetate, scandium propionate, scandium 2-ethylhexanoate, scandium benzoate, scandium benzoates in which one or more of the benzoate groups is ring-substituted with alkyl, $CF_3$, cyano, $COCH_3$, halogen, hydroxyl, alkoxyl and the like; scandium salicylate; scandium acetylacetonate and scandium t-butylacetylacetonate.

c) yttrium alkoxides such as yttrium methoxide, yttrium ethoxide, yttrium isopropoxide, yttrium t-butoxide, yttrium sec-butoxide and the like; yttrium aryloxides such as yttrium phenoxide, and yttrium phenoxides in which one or more of the phenoxide groups is ring-substituted with alkyl, $CF_3$, cyano, $COCH_3$, halogen, hydroxyl, alkoxyl and the like; yttrium carboxylates such as yttrium formate, yttrium acetate, yttrium propionate, yttrium 2-ethylhexanoate, yttrium benzoate, yttrium benzoates in which one or more of the benzoate groups is ring-substituted with alkyl, $CF_3$, cyano, $COCH_3$, halogen, hydroxyl, alkoxyl and the like, yttrium salicylate, yttrium 3,5-di-t-butyl salicylate; yttrium amides such as yttrium dimethylamide, yttrium diethylamide, yttrium diphenylamide, yttrium bis(trimethylsilyl)amide and the like; yttrium acetylacetonate and yttrium t-butylacetylacetonate.

d) hafnium alkyls such as such as tetraethyl hafnium, tetrabutyl hafnium, tetrabenzyl hafnium and the like; hafnium alkoxides such as hafnium tetramethoxide, hafnium tetraethoxide, hafnium tetraisopropoxide, hafnium tetra-t-butoxide, hafnium tetra-sec-butoxide and the like; hafnium aryloxides such as hafnium phenoxide and hafnium phenoxides in which one or more of the phenoxide groups is ring-substituted with alkyl, $CF_3$, cyano, $COCH_3$, halogen, hydroxyl, alkoxyl and the like; hafnium carboxylates such as hafnium formate, hafnium acetate, hafnium propionate, hafnium 2-ethylhexanoate, hafnium benzoate, hafnium benzoates in which one or more of the benzoate groups is ring-substituted with alkyl, $CF_3$, cyano, $COCH_3$, halogen, hydroxyl, alkoxyl and the like, hafnium salicylate, hafnium 3,5-di-t-butyl salicylate; hafnium amides such as hafnium tetra(dimethylamide), hafnium tetra(diethylamide), hafnium tetra(diphenylamide), hafnium tetra((bistrimethylsilyl)amide); hafnium acetylacetonate and hafnium t-butylacetylacetonate.

e) titanium alkyls such as such as tetraethyl titanium, tetrabenzyl titanium and the like; titanium alkoxides such as titanium tetramethoxide, titanium tetraethoxide, titanium tetraisopropoxide, titanium tetra-t-butoxide, titanium tetra-sec-butoxide and the like; titanium aryloxides such as titanium phenoxide and titanium phenoxides in which one or more of the phenoxide groups is ring-substituted with alkyl, $CF_3$, cyano, $COCH_3$, halogen, hydroxyl, alkoxyl and the like; titanium carboxylates such as titanium formate, titanium acetate, titanium propionate, titanium 2-ethylhexanoate, titanium benzoate, titanium benzoates in which one or more of the benzoate groups is ring-substituted with alkyl, $CF_3$, cyano, $COCH_3$, halogen, hydroxyl, alkoxyl and the like, titanium salicylate, titanium 3,5-di-t-butyl salicylate; titanium amides such as titanium tetra(dimethylamide), titanium tetra(diethylamide, titanium tetra(diphenylamide), titanium tetra((bistrimethylsilyl)amide); titanium acetylacetonate and titanium t-butylacetylacetonate.

f) zirconium alkyls such as such as tetraethyl zirconium, tetrabutyl zirconium, tetrabenzyl zirconium and the like; zirconium alkoxides such as zirconium tetramethoxide, zirconium tetraethoxide, zirconium tetraisopropoxide, zirconium tetra-t-butoxide, zirconium tetra-sec-butoxide and the like; zirconium aryloxides such as zirconium phenoxide and zirconium phenoxides in which one or more of the phenoxide groups is ring-substituted with alkyl, $CF_3$, cyano, $COCH_3$, halogen, hydroxyl, alkoxyl and the like; zirconium carboxylates such as zirconium formate, zirconium acetate, zirconium propionate, zirconium 2-ethylhexanoate, zirconium benzoate, zirconium benzoates in which one or more of the benzoate groups is ring-substituted with alkyl, $CF_3$, cyano, $COCH_3$, halogen, hydroxyl, alkoxyl and the like, zirconium salicylate, zirconium 3,5-di-t-butyl salicylate; zirconium amides such as zirconium tetra(dimethylamide), zirconium tetra(diethylamide, zirconium tetra(diphenylamide), zirconium tetra((bistrimethylsilyl)amide); zirconium acetylacetonate and zirconium t-butylacetylacetonate.

g) vanadium alkoxides such as vanadium methoxide, vanadium ethoxide, vanadium isopropoxide, vanadium t-butoxide, vanadium sec-butoxide and the like; vanadium oxo tris(alkoxides) such as vanadium oxo tris(methoxide), vanadium oxo tris(ethoxide), vanadium oxo tris(isopropoxide), vanadium oxo tris(t-butoxide), vanadium oxo tris(sec-butoxide) and the like; vanadium aryloxides such as vanadium phenoxide and vanadium phenoxides in which one or more of the phenoxide groups is ring-substituted with alkyl, $CF_3$, cyano, $COCH_3$, halogen, hydroxyl, alkoxyl and the like; vanadium carboxylates such as vanadium formate, vanadium acetate, vanadium propionate, vanadium 2-ethylhexanoate, vanadium benzoate, vanadium benzoates in which one or more of the benzoate groups is ring-substituted with alkyl, $CF_3$, cyano, $COCH_3$, halogen, hydroxyl, alkoxyl and the like, vanadium salicylate, vanadium 3,5-di-t-butyl salicylate; vanadium tris(acetylacetonate) and vanadium tris (t-butylacetylacetonate); vanadium oxo bis(acetylacetonate).

h) zinc alkyls such as such as dimethyl zinc, diethyl zinc, dibutyl zinc, dibenzyl zinc and the like; alkyl zinc alkoxides such as ethyl zinc isopropoxide; zinc alkoxides such as zinc methoxide, zinc ethoxide, zinc isopropoxide, zinc t-butoxide, zinc sec-butoxide and the like; zinc aryloxides such as zinc phenoxide and zinc phenoxides in which one or more of the phenoxide groups is ring-substituted with alkyl, $CF_3$, cyano, $COCH_3$, halogen, hydroxyl, alkoxyl and the like; zinc carboxylates such as zinc formate, zinc acetate, zinc propionate, zinc 2-ethylhexanoate, zinc benzoate, zinc benzoates in which one or more of the benzoate groups is ring-substituted with alkyl, $CF_3$, cyano, $COCH_3$, halogen, hydroxyl, alkoxyl and the like, zinc salicylate, zinc 3,5-di-t-butyl salicylate; zinc amides such as zinc dimethylamide, zinc diethylamide, zinc diphenylamide, zinc (bistrimethylsilyl)amide; zinc acetylacetonate and zinc t-butylacetylacetonate.

i) trialkyl aluminum compounds such as trimethylaluminum, triethyl aluminum, tributyl aluminum, tribenzylaluminum and the like; aluminum alkoxides such as aluminum trimethoxide, aluminum triethoxide, aluminum triisopropoxide, aluminum tri-n-butoxide, aluminum tri-t-butoxide, aluminum tri-sec-butoxide and the like; aluminum aryloxides such as aluminum phenoxide and aluminum phenoxides in which one or more of the phenoxide groups is ring-substituted with alkyl, $CF_3$, cyano, $COCH_3$, halogen, hydroxyl, alkoxyl and the like; aluminum carboxylates such as aluminum formate, aluminum acetate, aluminum propionate, aluminum 2-ethylhexanoate, aluminum benzoate, aluminum benzoates in which one or more of the benzoate groups is ring-substituted with alkyl, $CF_3$, cyano, $COCH_3$, halogen, hydroxyl, alkoxyl and the like, aluminum salicylate, aluminum 3,5-di-t-butyl salicylate; aluminum amides such as aluminum tris(dimethylamide), aluminum tris(diethylamide), aluminum tris(diphenylamide), aluminum tris(di(trimethylsilyl)amide) and the like; aluminum acetylacetonate; aluminum t-butylacetylacetonate; and alkyl aluminum oxides and alkoxides such as diethylaluminum ethoxide, dimethylaluminum ethoxide, diethylaluminum isopropoxide, dimethylaluminum isopropoxide, methyl aluminoxane, tetraethyldialuminoxane and the like. In exemplary embodiments, use of aluminum carboxylates such as aluminum formate, aluminum acetate, aluminum propionate, aluminum 2-ethylhexanoate, aluminum benzoate, aluminum benzoates in which one or more of the benzoate groups is ring-substituted with alkyl may be avoided.

j) trialkyl gallium compounds such as trimethylgallium, triethyl gallium, tributyl gallium, tribenzylgallium and the like; gallium alkoxides such as gallium trimethoxide, gallium triethoxide, gallium triisopropoxide, gallium tri-t-butoxide, gallium tri-sec-butoxide and the like; gallium aryloxides such as gallium phenoxide and gallium phenoxides in which one or more of the phenoxide groups is ring-substituted with alkyl, $CF_3$, cyano, $COCH_3$, halogen, hydroxyl, alkoxyl and the like; gallium carboxylates such as gallium formate, gallium acetate, gallium propionate, gallium 2-ethylhexanoate, gallium benzoate, gallium benzoates in which one or more of the benzoate groups is ring-substituted with alkyl, $CF_3$, cyano, $COCH_3$, halogen, hydroxyl, alkoxyl and the like, gallium salicylate, gallium 3,5-di-t-butyl salicylate; gallium amides such as gallium tris(dimethylamide), gallium tris(diethylamide), gallium tris(diphenylamide), gallium tris(di(trimethylsilyl)amide) and the like; gallium acetylacetonate; gallium t-butylacetylacetonate; and alkylgallium alkoxides such as diethylgallium ethoxide, dimethylgallium ethoxide, diethylgallium isopropoxide and dimethylgallium isopropoxide;

k) trialkyl indium compounds like trimethyl indium; indium alkoxides such as indium methoxide, indium ethoxide, indium isopropoxide, indium t-butoxide, indium sec-butoxide and the like; indium aryloxides such as indium phenoxide and indium phenoxides in which one or more of the phenoxide groups is ring-substituted with alkyl, $CF_3$, cyano, $COCH_3$, halogen, hydroxyl, alkoxyl and the like; indium carboxylates such as indium formate, indium acetate, indium propionate, indium 2-ethylhexanoate, indium benzoate, indium benzoates in which one or more of the benzoate groups is ring-substituted with alkyl, $CF_3$, cyano, $COCH_3$, halogen, hydroxyl, alkoxyl and the like, indium salicylate, indium 3,5-di-t-butyl salicylate; indium acetylacetonate; and indium t-butylacetylacetonate; and l) stannous phosphate; stannous pyrophosphate, stannous alkoxides such as stannous methoxide, stannous ethoxide, stannous isopropoxide, stannous t-butoxide, stannous sec-butoxide and the like; stannous aryloxides such as stannous phenoxide and stannous phenoxides in which one or more of the phenoxide groups is ring-substituted with alkyl, $CF_3$, cyano, $COCH_3$, halogen, hydroxyl, alkoxyl and the like; stannous carboxylates such as stannous formate, stannous acetate, stannous propionate, stannous 2-ethylhexanoate, stannous benzoate, stannous benzoates in which one or more of the benzoate groups is ring-substituted with alkyl, $CF_3$, cyano, $COCH_3$, halogen, hydroxyl, alkoxyl and the like, stannous salicylate, stannous 3,5-di-t-butyl salicylate; stannous acetylacetonate; and stannous t-butylacetylacetonate.

In addition to the foregoing, other suitable MG3-15LA compounds include magnesium, Group 3-Group 15, or lanthanide series metal alkoxides, whereas one or more of the alkoxide group(s) are the conjugate base, after removal of one or more hydroxyl hydrogen atoms, from (1) an initiator compound as described below, (2) a polyether monol or polyether polyol product of the polymerization reaction or (3) a polyether having a molecular weight intermediate to the initiator and the polyether monol or polyether polyol product of the polymerization.

Polyurethane Products

The polycarbonate based polyol, such as the poly(ethercarbonate) polyol, is useful to make a wide variety of polyurethane products, such as slabstock foams, molded foams, flexible foams, viscoeleastic foams, combustion modified foams, rigid foams, elastomers, adhesives, sealants, and/or coatings. The polyurethane product may be useful in a variety of packaging applications, comfort applications (such as mattresses—including mattress toppers, pillows, furniture, seat cushions, etc.), shock absorber applications (such as bumper pads, sport and medical equipment, helmet liners, etc.), thermal insulation applications, electroconductivity for anti-static packaging of electronic goods, and noise and/or vibration dampening applications (such as earplugs, automobile panels, etc.)

The polyurethane product may be prepared as the reaction product of a polyurethane forming formulation that includes an isocyanate component and an isocyanate-reactive component. The isocyanate component may include one or more polyisocyanates, one or more isocyanate-terminated prepolymers, and/or a combination thereof. The poly(ethercarbonate) polyol may be the only polyol or one of two or more polyols (e.g., to adjust the solids content to a desired level or provide particular characteristics to the polyurethane) included in the isocyanate-reactive component. The isocyanate-reactive component and/or the isocyanate-component may further include at least one additive. Exemplary additives include catalysts, surfactants, blowing agents, and other additives for polyurethanes as would be known to a person of ordinary skill in the art.

With respect to the isocyanate component, exemplary isocyanates include aromatic, cycloaliphatic, and aliphatic isocyanates, and isocyanate-terminated prepolymer derived from at least one selected from the group of aromatic, cycloaliphatic, and aliphatic isocyanates. The amount of isocyanate component used in making a polyurethane product is commonly expressed in terms of isocyanate index. The isocyanate index is defined as the molar stoichiometric excess of isocyanate moieties in a reaction mixture with respect to the number of moles of isocyanate-reactive units (active hydrogens available for reaction with the isocyanate moiety), multiplied by 100. An isocyanate index of 100 means that there is no stoichiometric excess, such that there is 1.0 mole of isocyanate groups per 1.0 mole of isocyanate-reactive groups, multiplied by 100. In embodiments, the isocyanate index may range from about 70 to 400.

With respect to the isocyanate-reactive component, the polycarbonate based polyol may be blended with one or more additional polyols. For example, the polycarbonate based polyol may comprise from 5 wt % to 90 wt % (e.g., 5 wt % to 80 wt %, 10 wt % to 70 wt %, 10 wt % to 60 wt %, 15 wt % to 50 wt %, 15 wt % to 40 wt %, 15 wt % to 30 wt %, 15 wt % to 25 wt %, etc.) of the isocyanate-reactive component. The additional polyol, may be a polyether polyol having a nominal hydroxyl functionality of 2 to 8 and a number average molecular weight from 1,000 g/mol to 20,000 g/mol.

Various additives may be added to the reaction mixture for forming the polyurethane product to adjust characteristics of the resultant product, e.g., additives known to those of ordinary skill in the art may be used. Additives may be added as part of the isocyanate component and/or the isocyanate-reactive component. Exemplary additives include a catalyst, an adhesion promoter, a surfactant, a moisture scavenger, a cell opener, an antioxidant, a curative, a pH neutralizer, a UV stabilizer, an antistatic agent, a plasticizer, a compatibilizer, a filler, a reinforcing agent, a flame retardant, pigments/dyes, a mold release agent, and/or a crosslinker.

If the polyurethane product is a foam, product may be formed using a one-shot method, such a slabstock process (e.g., as free rise foam), a molding process (such as in a box foaming process), or any other process known in the art. In a slabstock process, the components may be mixed and poured into a trough or other region where the formulation reacts, expands freely in at least one direction, and cures. Slabstock processes may be operated continuously at commercial scales. In a molding process, the components may be mixed and poured into a mold/box (heated or non-heated) where the formulation reacts, expands without the mold in at least one direction, and cures.

The polyurethane foam may be prepared at initial ambient conditions (i.e., room temperature ranging from 20° C. to 25° C. and standard atmospheric pressure of approximately 1 atm). For example, the polyurethane foam may include the solid functional additive (e.g., a polymer that has a melting point above 100° C.), added via the modified copolymer polyol, without requiring heating or application of pressure to the isocyanate-reactive component. Foaming at pressure below atmospheric condition can also be done, to reduce foam density and soften the foam. Foaming at pressure above atmospheric condition can be done, to increase foam density and therefore the foam load bearing as measured by indentation force deflection (IFD). In a molding processing, the polyurethane foam may be prepared at initial mold temperature above ambient condition, e.g., 50° C. and above. Overpacking of mold, i.e. filling the mold with extra foaming material, can be done to increase foam density.

The following examples are provided to illustrate the invention, but are not intended to limit the scope thereof. All parts and percentages are by weight unless otherwise indicated. All molecular weight values are based on number average molecular weight, unless indicated otherwise.

EXAMPLES

Approximate properties, characters, parameters, etc., are provided below with respect to various working examples, comparative examples, and the materials used in the working and comparative examples.

Preparation of Polycarbonate Based Polyols

The following materials are principally used:

DMC A zinc hexacyanocobaltate catalyst complex (exemplary grades available from Bayer Material Science).

Starter 1 A propoxylated polyol that is glycerin-initiated, having a number average molecular weight of 700 g/mol and a nominal hydroxyl functionality of 3 (available from The Dow Chemical Company).

Starter 2 A propoxylated polyol that is glycerin-initiated, having a number average molecular weight of 450 g/mol and a nominal hydroxyl functionality of 3 (available from The Dow Chemical Company).

Starter 3 A propoxylated polyols that is propylene glycol-initiated, having a number average molecular weight of 400 g/mol and a nominal hydroxyl functionality of 2 (available from The Dow Chemical Company).

Promoter 1 Aluminum triisopropoxide ($Al(O\text{-}iPr)_3$), available from Acros Organics.

Promoter 2 Aluminum-tri-sec-butoxide ($Al(OBu)_3$), available from Gelest, Inc.

Promoter 3 Hafnium(IV) tert-butoxide ($Hf(OBu)_4$), available from Gelest, Inc.

Promoter 4 Magnesium di-tert-butoxide ($Mg(OBu)_2$), available from Sigma Aldrich.

Promoter 5 Gallium(III) ethoxide ($Ga(OEt)_3$), available from Gelest, Inc.

Promoter 6 Indium(III) ethoxide ($In(OEt)_3$), available from Alfa Aesar.

Promoter 7 Titanium(IV) ethoxide ($Ti(OEt)_4$), available from Gelest, Inc.

Various Examples are discussed below:

Examples 1 to 3—Promoter Vs. No Promoter

For each of Examples 1 to 3, during a preliminary stage, the reactor is heated to 130° C. and purged continuously with nitrogen for 1.5 hours to dry the contents of the reactor, which occurs after the addition of the DMC, Starter 1, and the Promoter 1 (if used), but before addition of any propylene oxide. Then, the reactor is heated to 150° C. and an initial charge of 18.4 mL of propylene oxide is added for catalyst activation. The pressure in the reactor increases to an initial pressure of 11.7 psig and upon catalyst activation the pressure declines to less than 2 psig. The reactor is then cooled to 100° C. and taken to 70 psig by feeding carbon dioxide and then venting. This process of feeding and venting carbon dioxide is further repeated twice. During the polymerization stage, the pressure is increased to 105 psig by co-feeding the propylene oxide and carbon dioxide into the reactor at the molar ratio provided in Table 1. Then, the co-feeding is stopped and for the first digestion stage the pressure in the reactor is allowed to decrease to 95 psig. Prior to the second digestion stage, the addition of propylene oxide and carbon dioxide is started again at the same molar ratio and continued until the reactor pressure increases again to 105 psig. Then, again, the co-feeding is stopped and for the second digestion stage the pressure in the reactor is allowed to decrease to 95 psig. For each reactant addition cycle, the time required for the reactor pressure to decline from 105 psig to 95 psig, which is indicative of the catalytic activity, is shown in Table 1 below. After the reactor pressure had declined to 95 psig for the second time, no more reactants are added. The pressure profile in the reactor is followed, and once stabilized (i.e., no further change), the reactor is cooled and the reactor pressure is vented. The contents of the reactor are purged with nitrogen for 30 minutes with stirring to remove unreacted propylene oxide, carbon dioxide, and volatile organic compounds. The product is analyzed via GPC and NMR.

Example 1

A sample of 0.05 grams of DMC is dissolved in 99.6 grams of the Starter 1 and then dried in a 1 liter capacity reactor according to the general procedure outlined above. Then, the reactor is heated to 150° C. and an initial charge of 18.4 mL of propylene oxide is added for catalyst activation. The pressure in the reactor initially increases to 11.7 psig and upon catalyst activation the pressure declines to less than 2 psig. The reactor is then cooled to 100° C. and taken to 70 psig by feeding carbon dioxide and then venting. This process of feeding and venting carbon dioxide is further repeated twice. Next, during the subsequent polymerization stage, a total of 2.7 g of propylene oxide and 2 grams of carbon dioxide are added over a period of 3 hours under polymerization conditions.

Example 2

A sample of 0.05 grams of DMC is dissolved in 99.6 grams of the Starter 1 and then dried in a 1 liter capacity reactor according to the general procedure outlined above. Then, the reactor is heated to 150° C. and an initial charge of 18.4 mL of propylene oxide is added for catalyst activation. The pressure in the reactor initially increases to 11.7 psig and upon catalyst activation the pressure declines to less than 2 psig. The reactor is then cooled to 100° C. and taken to 70 psig by feeding carbon dioxide and then venting. This process of feeding and venting carbon dioxide is further repeated twice. Next, during the subsequent polymerization stage, a total of 61.5 grams of propylene oxide and 10.1 grams of carbon dioxide are added over a period of 2.5 hours under polymerization conditions.

Example 3

A sample of 0.05 grams of DMC and 0.5 grams of Promoter 1 are dissolved in 99.6 grams of the Starter 1 and then dried in a 1 liter capacity reactor according to the general procedure outlined above. Then, the reactor is heated to 150° C. and an initial charge of 18.4 mL of propylene oxide is added for catalyst activation. The pressure in the reactor initially increases to 11.7 psig and upon catalyst activation the pressure declines to less than 2 psig. The reactor is then cooled to 100° C. and taken to 70 psig by feeding carbon dioxide and then venting. This process of feeding and venting carbon dioxide is further repeated twice. Next, during the subsequent polymerization stage, a total of 75.9 grams of propylene oxide and 12.5 grams of carbon dioxide are added over a period of 2.5 hours under polymerization conditions.

Referring to the above, the use of the promoter appears to be able to improve the process when using the DMC catalyst, as compared to the case when the promoter is not present. For example, with respect to Example 3, the activity increased by an approximate factor of 6 and the carbon dioxide incorporation increased by an approximate factor of 34 when compared Example 2. In particular, Example 3 resulted in a polyol yield of 99.6%.

Examples 4 to 6—Varying Amounts of Promoter

During a preliminary stage, predefined amounts of DMC catalyst and the Promoter 1, in amounts as shown in Table 2, are dissolved in 144 grams of the Starter 1 and then dried in a 1 L capacity reactor by heating to 130° C. and purging continuously with nitrogen for 2 hours. Then, the reactor is heated to 150° C. and an initial charge of 21.6 grams of propylene oxide are added for catalyst activation. The pressure in the reactor is initially increased to approximately 10 psig and upon catalyst activation the pressure declines to less than 2 psig. The reactor is then cooled to reaction temperature (T) provided in Table 2 and the pressure is taken to 70 psig by feeding carbon dioxide and then venting. This process of feeding and venting carbon dioxide is further repeated twice.

Then, the pressure is increased or decreased to reaction pressure (P) provided in Table 2, which initiates the polymerization stage. During the polymerization stage, propylene oxide is fed at a rate of 1 mL/min until the amount listed in Table 2 (Oxide) is reached. During the oxide feed, the pressure in the reactor shown in Table 2 is maintained by feeding $CO_2$ on demand when the pressure drops 2.5 psi below the target pressure and the $CO_2$ feed is stopped when the reactor reached a pressure 2.5 psi higher than the target pressure. After the propylene oxide feed is stopped, the pressure is maintained by feeding carbon dioxide and digesting until the pressure in the reactor does not change anymore. Then, the reactor is cooled to room temperature and the reactor pressure is vented. The contents of the reactor are purged with nitrogen for 30 minutes to remove unreacted propylene oxide and carbon dioxide. The product is analyzed by GPC and NMR.

TABLE 1

| Ex. | $CO_2$:PO feed ratio | Catalyst | Activity | NMR $CO_2$ in poyol mol % | GPC wt % by-product | GPC MW of polyol (g/mol) | Activity $1^{st}$ digestion (min) | Activity $2^{nd}$ digestion (min) |
|---|---|---|---|---|---|---|---|---|
| 1 | 1:1 | DMC | No | — | — | — | — | — |
| 2 | 1:5 | DMC | Yes | 0.1 | 0 | 1084 | 52 | 60 |
| 3 | 1:5 | DMC + Promoter 1 | Yes | 3.4 | 0.4 | 1227 | 8 | 10 |

TABLE 2

| Ex. | DMC grams | Promoter 1 grams | T °C. | P psig | Oxide grams | CO2 content wt % | Polyol selectivity wt % | Mn g/mol | PDI |
|---|---|---|---|---|---|---|---|---|---|
| 4 | 0.015 | 0.056 | 150 | 60 | 282.61 | 0.3 | 99.0 | 1910 | 1.06 |
| 5 | 0.05 | 0.466 | 90 | 120 | 283.00 | 10.4 | 95.9 | 2026 | 1.14 |
| 6 | 0.05 | 0.186 | 90 | 60 | 282.43 | 7.4 | 96.7 | 2013 | 1.07 |

Referring to Table 2, Examples 4 to 6 demonstrate that the combination of DMC catalyst and promoter enables the incorporation of carbon dioxide into polyether polyols at levels from 0.3 wt % to 10.4 wt % according to the provided definition under mild temperature and pressure conditions by first activating the catalyst combination under nitrogen and thereafter adding carbon dioxide at low pressures. The promoter and the DMC catalyst may be present at a weight ratio of 1:1 to 20:1 (e.g., 2:1 to 15:1, 3:1 to 12:1, 4:1 to 10:1, etc.).

Examples 7 to 12—Varying Temperatures and Pressures

During a preliminary stage, DMC catalyst (0.027 grams) and the Promoter 2, in amounts as shown in Table 3, are mixed with 140 grams of the Starter 1 in a bottle under dry conditions and sonicated for 45 minutes. The contents of the bottle are added to a 1 L capacity reactor and stirred for the entire time of the process that ensued. Then, the reactor is heated to 130° C. and purged continuously with nitrogen for 2 hours. After closing the reactor vent and stopping the nitrogen flow, the temperature in the reactor is increased to 140° C. while the pressure is taken to 70 psig by feeding carbon dioxide and then venting. This process of feeding and venting carbon dioxide is further repeated twice.

Then, the reactor is taken to 60 psig by feeding carbon dioxide and an initial charge of 15.6 grams of propylene oxide is added to the reactor for catalyst activation. The pressure in the reactor initially increases by approximately 10-20 psig, and upon catalyst activation the pressure declines back to approximately 60-65 psig. The reactor is then taken to the temperature (T) and pressure (P) defined in Table 3, which initiates the polymerization stage. During the polymerization stage, propylene oxide is fed at a rate of 1 mL/min and stopped when 259 grams of propylene oxide have been fed. During the oxide feed, the pressure in the reactor shown in Table 3 is maintained by feeding carbon dioxide on demand when the pressure drops 2.5 psi below the target pressure and the carbon dioxide feed is stopped when the reactor reached a pressure 2.5 psi higher than the target pressure. After the propylene oxide feed is stopped, the pressure is maintained by feeding carbon dioxide and digesting until the pressure in the reactor does not change anymore. Then, the reactor is cooled to room temperature and the reactor pressure is vented. The contents of the reactor are purged with nitrogen for 30 minutes under stirring to remove unreacted propylene oxide and carbon dioxide. The product is analyzed via GPC and NMR.

TABLE 3

| Ex. | Promoter 2 grams | T °C. | P psig | CO2 content wt % | Polyol selectivity wt % | Mn g/mol | PDI | Activation Time [hh:mm] | Digestion Time [hh:mm] | Total Batch Time [hh:mm] |
|---|---|---|---|---|---|---|---|---|---|---|
| 7 | 0 | 110 | 100 | 5.9 | 96.5 | 1956 | 1.47 | 1:05 | 6:50 | 15:44 |
| 8 | 0.153 | 110 | 100 | 6.8 | 97.3 | 2120 | 1.04 | 1:19 | 0:30 | 5:42 |
| 9 | 0.076 | 80 | 140 | 4.9 | 97.6 | 1191 | 1.14 | 5:48 | 0:17 | 6:05 |
| 10 | 0.229 | 80 | 140 | 15.1 | 97.6 | 2131 | 1.22 | 5:29 | 14:44 | 22:33 |
| 11 | 0.076 | 80 | 60 | 9.8 | 98.9 | 2066 | 1.12 | 1:53 | 7:25 | 12:11 |
| 12 | 0.076 | 140 | 60 | 0.8 | 98.2 | 2067 | 1.02 | 1:07 | 0:10 | 5:24 |

Referring to Table 3, Example 7 is a comparative example of the same process operated in Example 8, but without the addition of a promoter. Example 7 requires a significantly longer digest time and overall batch time compared to the identical process run with the addition of a promoter.

In particular, Examples 7 to 12 demonstrate that the process according to exemplary embodiments may be successfully initiated and operated by first activating the DMC catalyst by adding an oxides such propylene oxide under carbon dioxide in the presence of a promoter, and then continuing to add the oxide and carbon dioxide under mild temperature and pressure conditions. This process enables the elimination of a separate catalyst activation step performed under a nitrogen atmosphere. Further, the process allows the immediate activation of DMC catalyst under mild carbon dioxide pressure followed by continuous addition of oxides and carbon dioxide until the process (e.g., semi-batch process) is complete. Thus, saving valuable reactor time.

Examples 13 to 17—Varying Promoters

During a preliminary stage, DMC catalyst (0.028 grams) and a promoter (the type and amount according to Table 4) are mixed with 144 grams of the Starter 1 in a bottle under dry conditions and sonicated for 45 minutes. The contents of the bottle are added to a 1 L capacity reactor and stirred for the entire time of the process that ensued. Then, the reactor is heated to 130° C. and purged continuously with nitrogen for 2 hours. After closing the reactor vent and stopping the nitrogen flow, the temperature in the reactor is increased to 140° C. while the pressure is taken to 70 psig by feeding carbon dioxide and then venting. This process of feeding and venting carbon dioxide is further repeated twice.

Then, the reactor is taken to 60 psig by feeding carbon dioxide and an initial charge of 16.0 grams of propylene oxide is added to the reactor for catalyst activation. The pressure in the reactor initially increased by approximately 10-20 psig, and upon catalyst activation the pressure declined back to approximately 60-65 psig. The reactor is then taken to 110° C. and 100 psig by feeding carbon dioxide. During the polymerization stage, propylene oxide is fed at a rate of 1 mL/min and stopped when 266.8 grams of propylene oxide have been fed. During the oxide feed, the pressure in the reactor defined above is maintained by feeding carbon dioxide on demand when the pressure drops 2.5 psi below the target pressure and the carbon dioxide feed is stopped when the reactor reached a pressure 2.5 psi higher than the target pressure. After the propylene oxide feed is stopped, the pressure is maintained by feeding carbon dioxide and digesting until the pressure in the reactor did not change anymore. Then, the reactor is cooled to room temperature and the reactor pressure is vented. The content of the reactor is purged with nitrogen for 30 minutes under stirring to remove unreacted propylene oxide and carbon dioxide. The product is analyzed by GPC and NMR.

TABLE 4

| Ex. | Promoter | CO$_2$ content grams | Polyol selectivity wt % | Mn wt % | PDI g/mol | Activation Time [hh:mm] | Digestion Time [hh:mm] | Total Batch Time [hh:mm] |
|---|---|---|---|---|---|---|---|---|
| 13 | Promoter 3 | 0.292 | 6.1 | 96.5 | 1942 | 1.25 | 3:00 | 7:03 | 12:50 |
| 14 | Promoter 4 | 0.110 | 6.5 | 96.6 | 1969 | 1.32 | 3:52 | 4:18 | 10:54 |
| 15 | Promoter 5 | 0.130 | 7.6 | 97.0 | 1972 | 1.58 | 2:42 | 3:53 | 9:41 |
| 16 | Promoter 6 | 0.160 | 5.5 | 96.0 | 1944 | 1.19 | 3:17 | 5:30 | 10:59 |
| 17 | Promoter 7 | 0.217 | 4.9 | 96.2 | 1857 | 1.28 | 4:27 | 7:40 | 14:03 |

Referring to Table 4, it is shown that the process according to exemplary embodiments with the use of different types of promoters.

Example 18—Varying Oxides

During a preliminary stage, DMC catalyst (0.454 grams) and the Promoter 2 (2.538 grams) are mixed with 908 grams of the Starter 2 in a bottle under dry conditions and sonicated for 45 minutes. The content of the bottle are added to a 6 L capacity reactor and stirred for the entire time of the process that ensued. Then, the reactor is heated to 130° C. and purged continuously with nitrogen for 2 hours. After closing the reactor vent and stopping the nitrogen flow, the temperature in the reactor is increased to 140° C. while the pressure is taken to 70 psig by feeding carbon dioxide and then venting. This process of feeding and venting carbon dioxide is further repeated twice.

Then, the reactor is taken to 60 psig by feeding carbon dioxide and an initial charge of 100.8 grams of propylene oxide is added to the reactor for catalyst activation. The pressure in the reactor initially increases by about 10-20 psig, and upon catalyst activation the pressure declines back to 60-65 psig. The reactor is then taken to 105° C. and 90 psig by feeding carbon dioxide. During the polymerization stage, propylene oxide is fed at 12 mL/min and ethylene oxide is fed at 1.62 g/min until a total of 4162 grams of propylene oxide and 672 grams of ethylene oxide are fed. During the oxide feed, the pressure in the reactor shown in Table 3 is maintained by feeding carbon dioxide on demand when the pressure drops 2.5 psi below the target pressure and the carbon dioxide feed is stopped when the reactor reached a pressure 2.5 psi higher than the target pressure. After the propylene oxide and ethylene oxide feeds are stopped, the pressure is maintained by feeding carbon dioxide and digesting until the pressure is maintained by feeding carbon dioxide and digesting until the pressure in the reactor does not change anymore. Then, the reactor is cooled to room temperature and the reactor pressure is vented. The contents of the reactor are purged with nitrogen for 30 minutes under stirring to remove unreacted propylene oxide, ethylene oxide, and carbon dioxide. The resulting polyol product has a number average molecular weight of 2837 g/mole by GPC analysis, and contains 5.2 weight percent CO$_2$ with a polyol selectivity of 96.7%.

Example 18 demonstrates that polyols containing ethylene oxide, propylene oxide, and carbon dioxide may be prepared to a targeted weight % composition of carbon dioxide, and the resulting polyol makes good quality flexible polyurethane foam when compared to a similar polyether polyol that is not made with any carbon dioxide.

The polyol of Example 18 is further tested for use in exemplary polyurethane formulations. In particular, Example 18 is combined with TDI (which is commercially available as VORANATE™ from The Dow Chemical Company) in the formulation of Table 5 to prepare a flexible polyurethane foam. The foam of the formulation is compared to a similar polyether polyol of similar hydroxyl equivalent weight and weight percent of ethylene oxide content, but without the inclusion of carbon dioxide as a co-reactant. The polyol of the comparative example is prepared with VORANOL™ 8136, a commercial polyol prepared with a DMC catalyst available from The Dow Chemical Company.

To prepare the foam examples for Examples 19 to 21 in Table 5, wooden boxes of 38 cm×38 cm×24 cm are used for box foaming, which were lined with plastic film for easy demolding. A high shear pin shape mixer is used to mix the materials. The components except KOSMOS® 29 and VORANATE™ T-80 TDI are mixed at a speed of 2400 rpm for 15 seconds. Then, the KOSMOS® 29 is added with additional mixing of 15 seconds at 2400 rpm. Next, the TDI is added with additional mixing for 3 seconds at a high speed of 3,000 rpm. The resultant mixture is then poured into the box. The foam is allowed to cure overnight before cutting and testing. Referring to Table 5, Examples 19 and 20 are prepared using commercially available polyols. Example 21 is prepared using the Polyol for Example 18, according to exemplary embodiments.

TABLE 5

| | Examples | | |
|---|---|---|---|
| Components (parts by weight) | 19 | 20 | 21 |
| VORANOL ™ 3136 | 100 | | |
| VORANOL ™ 8136 | | 100 | |
| Polyol Example 18 | | | 100 |

TABLE 5-continued

| | Examples | | |
|---|---|---|---|
| Components (parts by weight) | 19 | 20 | 21 |
| Water | 4.5 | 4.5 | 4.5 |
| Niax ® L-618 | 0.6 | 0.6 | 0.6 |
| DABCO ® BLV | 0.15 | 0.15 | 0.15 |
| KOSMOS ® 29 | 0.2 | 0.2 | 0.2 |
| VORANATE ™ T-80 TDI | 55.0 | 55.0 | 55.0 |

Foam properties for Examples 19 to 20 are shown below in Table 6.

TABLE 6

| | Example | | |
|---|---|---|---|
| | 19 | 20 | 21 |
| Airflow - dm3/s - ASTM D 3574 G | | | |
| Mean (cu_ft/min) | 6.07 | 4.73 | 3.48 |
| CFD ISO-3386 - ISO 3386/1 | | | |
| Mean 25% (kPa) | 8.81 | 10.26 | 11.15 |
| Mean 40% (kPa) | 9.57 | 11.27 | 12.34 |
| Mean 65% (kPa) | 15.63 | 18.36 | 20.28 |
| CS 90%, Original, Parallel - ASTM D 3574-03/D | | | |
| CT (%) | 2.90 | 3.35 | 4.34 |
| CD (%) | 3.20 | 3.70 | 4.79 |
| Free Rise Density - ASTM D1622-03 | | | |
| Density (lbm/cu ft) | 1.492 | 1.509 | 1.564 |
| IFD: ASTM D 3574-01 - Test B | | | |
| Load @ 25% Deflection (lbf) | 42.23 | 47.02 | 50.57 |
| Load @ 65% Deflection (lbf) | 79.47 | 90.47 | 99.41 |
| Load @ 25% Return (lbf) | 27.37 | 29.83 | 33.33 |
| Support Factor (%) | 1.88 | 1.92 | 1.97 |
| Hysteresis (%) | 64.81 | 63.45 | 65.92 |
| Resilience (Ball Rebound) Test - ASTM D-3574-H | | | |
| Average Resiliency (%) | 38 | 35 | 34 |
| Tear - ASTM D 3574-01 Test F | | | |
| Tear strength mean (lbf/in) | 2.36 | 1.97 | 1.81 |
| Tensile: (D3574) - ASTM D 3574-01 Test E | | | |
| Tensile strength mean (psi) | 16.34 | 18.85 | 19.77 |
| Elongation at break (mean), % (%) | 173.59 | 163.95 | 148.52 |

As shown in Table 6, a flexible polyurethane foam prepared from the polyol of Example 18 has physical properties that are very similar to the properties of a flexible polyurethane foam prepared from a polyol containing no $CO_2$.

Example 22-23—Polyols with Varying Molecular Weight and Functionality

During a preliminary stage, DMC catalyst (0.0461 grams) and Promoter 2 (0.258 grams) are mixed with 135 grams of the Starter 3 in a bottle under dry conditions and sonicated for 45 minutes. The contents of the bottle are added to a 1 L capacity reactor and stirred for the entire time of the process that ensued. Then, the reactor is heated to 130° C. and purged continuously with nitrogen for 2 hours. After closing the reactor vent and stopping the nitrogen flow, the temperature in the reactor is increased to 140° C. while the pressure is taken to 70 psig by feeding carbon dioxide and then venting. This process of feeding and venting carbon dioxide is further repeated twice.

Then, the reactor is taken to 60 psig by feeding carbon dioxide and an initial charge of 15 grams of propylene oxide is added to the reactor for catalyst activation. The pressure in the reactor initially increased by approximately 10-20 psig, and upon catalyst activation the pressure declined back to approximately 60-65 psig. The reactor is then taken to 110° C. and 100 psig by feeding carbon dioxide. During the polymerization stage, propylene oxide is fed at a rate of 1.5 mL/min and stopped when a total of 538.7 grams of propylene oxide have been fed. During the oxide feed, the pressure in the reactor defined above is maintained by feeding carbon dioxide on demand when the pressure drops 2.5 psi below the target pressure and the carbon dioxide feed is stopped when the reactor reached a pressure 2.5 psi higher than the target pressure. After the propylene oxide feed is stopped, the pressure is maintained by feeding carbon dioxide and digesting until the pressure in the reactor did not change anymore. Then, the reactor is cooled to room temperature and the reactor pressure is vented. The content of the reactor is purged with nitrogen for 30 minutes under stirring to remove unreacted propylene oxide and carbon dioxide. The product is analyzed by GPC and NMR. Results are shown in Table 7, below.

TABLE 7

| Ex. | $CO_2$ content wt % | Polyol selectivity wt % | Mn g/mol | PDI |
|---|---|---|---|---|
| 22 | 5.88 | 97.02 | 2837 | 1.15 |
| 23 | 5.06 | 92.56 | 2191 | 1.05 |

Examples 22 and 23 further illustrate that polyols of different molecular weight, functionality and carbon dioxide content can be prepared according exemplary embodiments.

Examples 24 and 25—Preparing Polyols at High Pressures

According to exemplary embodiments, the poly(ethercarbonate) polyols can be prepared at low pressures, which is desirable for industrial scale operations. Though, the embodiments also include preparing such polyols at high pressures.

During a preliminary stage, the amounts of DMC catalyst, Promoter 2, and Starter 1 are mixed in the amounts shown in Table 7 in a bottle under dry conditions and sonicated for 1 hour. The contents of the bottle are added to a 1.8 L capacity reactor and stirred for the entire time of the process that ensued. Then, the reactor is heated to 130° C. and purged continuously with nitrogen for 3 hours. After closing the reactor vent and stopping the nitrogen flow, the temperature in the reactor is increased to 140° C. while the pressure is taken to 70 psig by feeding carbon dioxide and then venting. This process of feeding and venting carbon dioxide is further repeated twice.

Then, the reactor is taken to 70 psig by feeding carbon dioxide and an initial charge of propylene oxide in the amount shown in Table 8 is added to the reactor for catalyst activation. The pressure in the reactor initially increased by about 10-20 psig (0.0689-0.138 MPa), and upon catalyst activation the pressure declined back to 70-75 psig. The reactor is then taken to 110° C. and to the pressure defined in Table 8 by feeding carbon dioxide. Once the target reactor pressure is reached, propylene oxide is fed at the flow rates shown in Table 8 and stopped when a total amount of propylene oxide shown in Table 8 has been fed. During the oxide feed, the pressure in the reactor defined above is maintained by feeding carbon dioxide on demand when the pressure drops 2.5 psi below the target pressure and the carbon dioxide feed is stopped when the reactor reached a pressure 2.5 psi higher than the target pressure. After the propylene oxide feed is stopped, the pressure is maintained by continuing to regulate the carbon dioxide pressure until the addition of carbon dioxide is stopped. Then, the reactor is cooled to 80° C. and the reactor pressure is vented. The content of the reactor is purged with nitrogen for 30 minutes under stirring to remove unreacted propylene and carbon dioxide. The product is then cooled down to room temperature and analyzed by GPC and NMR.

TABLE 8

| Ex. | Starter grams | DMC grams | Promoter 2 grams | Initial amount of PO fed mL | Total amount of PO fed mL | P psig | PO feed rate mL/min |
|---|---|---|---|---|---|---|---|
| 24 | 272.3 | 0.0599 | 0.4168 | 34.98 | 661.84 | 175 | 2.5 mL/min for 70 min<br>2.0 mL/min for 78 min<br>3.0 min/mi for 125 min |
| 25 | 260.4 | 0.0611 | 0.3491 | 32.57 | 668.13 | 588 | 2.0 mL/min for 60 min<br>2.3 mL/min for 84 min<br>2.5 min/mi for 130 min |

Characteristics of Examples 24 and 25 are shown in Table 9, below

TABLE 9

| Ex. | $CO_2$ content wt % | Polyol selectivity wt % | Mn g/mol | PDI |
|---|---|---|---|---|
| 24 | 7.76 | 95.55 | 1977 | 1.13 |
| 25 | 15.56 | 94.81 | 2178 | 1.60 |

Examples 24 and 25 illustrate that the embodiments are operable at elevated pressures, but that similar polyols can be prepared at similar levels of carbon dioxide incorporation under lower pressure operating condition such as those used for Example 10.

Example 26—Continuous Process of Preparing Polyols

Example 26 illustrates that the process of the embodiments is operable in a continuous polyol production process, and that polyols of varying carbon dioxide content can be prepared by manipulating the process conditions.

Example 26 is prepared in a 500 mL pressure reactor equipped with a recirculation loop, a mechanical agitator, and an exit port. The exit port is fitted with a heated plug flow section of tubing equal to 75 ml of volume. The pressure of the reactor is controlled at the plug flow section exit with a control valve under the control of a process control computer, which allows the reactor pressure to be maintained at a specified pressure set point. The outlet of the reactor flows through the pressure control valve and into a sample collection bottle where the product of the reaction is collected. The reactor is also equipped with a heated external recirculation loop. The reactor contents are circulated around the recirculation loop by means of a Micropump gear pump. The recirculation loop is equipped with a NIR flow cell which is attached to an ABB NIR analyzer. The NIR analyzer monitors the hydroxyl content and concentration of unreacted oxirane in the reaction mixture. The recirculation loop is further equipped with injection points for propylene oxide, ethylene oxide, carbon dioxide, glycerin (as a starter), and two separate injection points for catalysts. The oxides, carbon dioxide, and the glycerin are dispensed from storage cylinders into the recirculation loop via Bronkhorst mass flow controllers under the control of a process control computer.

DMC catalyst is prepared as a 2% by weight suspension in propylene glycol. The Promoter 2 is prepared as a 10% solution in dipropoxy n-butanol (DPnB). These components are each dispensed separately into the recirculation loop through Valco Instruments M50 model dispensing pumps at independent rates to provide the desired steady state concentrations of DMC catalyst and aluminum in the reaction mixture.

Feed ratios of all components are controlled to produce a polyol of the targeted number average molecular weight, wt % carbon dioxide, wt % ethylene oxide, and wt % propylene oxide. The rates of addition are controlled to result in a specified residence time in the reactor. Residence time is defined as the amount of time required to feed sufficient components by weight to the reactor to completely and precisely displace the full contents of the reactor one time.

The polyether carbonate polyol from Example No. 18 (375 grams) is placed into the reactor. The polyol has a number average molecular weight equal to 2837 g/mol, contains 5.9% $CO_2$ by weight (according to the definition provided), and also contains 3% propylene carbonate. The polyol contains 50 ppm of DMC catalyst, and 5 ppm of aluminum. The mixture is stirred and purged with nitrogen while heating to 130° C. The reactor is maintained at 130 C with constant stirring and nitrogen purge for 90 minutes to dry the reactor contents.

After the drying stage the nitrogen purge is stopped and the reactor vent is closed. The reactor pressure regulator is set to a control pressure of 60 psig. The reactor contents are recirculated through the NIR flow cell and back into the reactor until the reactor temperature equilibrates at 130° C. The addition of the DMC catalyst slurry (2% in MPG) is started at 11.3 microliters per minute, and the addition of Promoter 2 (10% w/w in DPnB) is started at 12.6 microliters per minute. The addition of propylene oxide is started at a rate of 1 gram per minute for 12 minutes, then 2 grams per minute for 12 minutes, then the addition of propylene oxide is increased to 2.67 grams per minute as the addition of ethylene oxide is started at a rate of 0.35 grams per minute and the addition of glycerin is started at 0.065 grams per minute. These flows produce a polyether polyol product with a hydroxyl equivalent weight of 1128 g/mole and a hydroxyl functionality of 2.74, containing 11.1 wt % EO.

When the pressure in the reactor rises to 60 psig the pressure control valve on the reactor outlet opens to allow product to flow out of the reactor and into a collection bottle. The pressure control valve maintains the reactor pressure throughout the remainder of the reactor operation.

The addition of the oxides is maintained until 320 grams of propylene oxide, 39 grams of ethylene oxide, and 28 grams of glycerin are added to the reactor, at which time the propylene oxide addition rate is reduced to 2.63 grams per minute and the addition of carbon dioxide is begun at a rate of 0.04 grams per minute. All other flows are maintained as before. The temperature of the reactor is slowly reduced from 130° C. to 110° C. over the course of 1 hour and thereafter is maintained at that temperature. The reactor pressure is reduced to 46 psig for the low pressure process.

These flow rates and operating conditions produce a polyol having a hydroxyl equivalent weight of approximately 1128 g/mole containing 11.1% EO by weight and 1% $CO_2$ by weight, in a continuous process running with a 3 hour residence time, a 75 ppm steady state concentration of DMC catalyst and a 46 ppm steady state concentration of aluminum. The process runs in a stable condition with a total unreacted oxide concentration equal to 2.0% by weight or less.

The concurrent addition of all components is maintained for a total of 70 hours, corresponding to more than 23 residence times in the reactor. The resulting product is analyzed and found to have a hydroxyl equivalent weight of 1026 mg KOH/g as measured by % OH titration, a number average molecular weight of 2950 g/mol and a polydispersity of 1.16 by GPC analysis. The polyol contains 1.2% carbon dioxide by weight and 0.39% cyclic propylene carbonate by weight as determined by FTIR analysis.

The addition rate of propylene oxide is then reduced to 2.61 grams per minute, and the carbon dioxide addition rate is increased to 0.062 grams per minute. The DMC catalyst slurry addition rate is increased to 14 microliters per minute, and the Promoter 2 solution addition rate is increased to 15.6 microliters per minute. The reactor pressure is increased to 50 psig. The process stabilizes and continues to run at a total concentration of unreacted oxide of 2.0% by weight or less for 16 hours, corresponding to more than 5 residence times in the reactor. The resulting product is analyzed and found to have a percent OH value of 1.63% as measured by % OH titration, a number average molecular weight of 3139 and a polydispersity of 1.16 by GPC analysis. The polyol contains 1.5% $CO_2$ by weight and 0.39% cyclic propylene carbonate by weight as determined by FTIR analysis.

Polyurethane flexible foam is prepared from the polyol of Example 26 according to the formulation in Table 10. The foam again is compared to a foam prepared using the same formulation with Example 26 substituted with VORANOL™ 8136 polyol. The formulation and properties of the resulting two foams are shown in Table 10, below.

TABLE 10

| | Examples | |
|---|---|---|
| Components (parts by weight) | 27 | 28 |
| VORANOL ™ 8136 | 100 | |
| Polyol Example 26 | | 100 |
| Water | 4.5 | 4.5 |
| Niax ® L-618 | 0.6 | 0.6 |
| DABCO ® BLV | 0.15 | 0.15 |
| KOSMOS ® 29 | 0.2 | 0.2 |
| VORANATE ™ T-80 TDI | 55.0 | 55.0 |

Foam Properties for Examples 27 and 26 are shown below in Table 11.

TABLE 11

| | Example | |
|---|---|---|
| | 27 | 28 |
| Airflow - dm³/s - ASTM D 3574 G | | |
| Mean (cu_ft/min) | 5.89 | 5.509 |
| CFD ISO-3386 - ISO 3386/1 | | |
| Mean 25% (kPa) | 9.06 | 9.2 |
| Mean 40% (kPa) | 9.85 | 9.95 |
| Mean 65% (kPa) | 16.31 | 16.34 |
| Mean Hysteresis | 46.91 | 44.50 |
| CS 90%, Original, Parallel - ASTM D 3574-03/D | | |
| CT (%) | 3.89 | 3.25 |
| CD (%) | 4.30 | 3.59 |
| Free Rise Density - ASTM D1622-03 | | |
| Density (lbm/cu_ft) | 1.538 | 1.539 |
| IFD: ASTM D 3574-01 - Test B | | |
| Load @ 25% Deflection (lbf) | 42.29 | 44.27 |
| Load @ 65% Deflection (lbf) | 83.57 | 83.34 |
| Load @ 25% Return (lbf) | 26.28 | 28.55 |
| Support Factor (%) | 1.98 | 1.88 |
| Hysteresis (%) | 62.14 | 64.48 |
| Resilience (Ball Rebound) Test - ASTM D-3574-H | | |
| Average Resiliency (%) | 35.8 | 36.6 |
| Tear - ASTM D 3574-01 Test F - Tear test | | |
| Tear strength mean (lbf/in) | 2.57 | 2.11 |
| Tensile: (D3574) - ASTM D 3574-01 Test E - Tensile | | |
| Tensile strength mean (psi) | 16.36 | 17.19 |
| Elongation at break (mean), % (%) | 171.46 | 173.47 |

As shown in Table 11, polyols prepared using $CO_2$ as a co-reactant in a continuous alkoxylation process are used to prepare flexible polyurethane foams with properties very similar to polyurethane foams prepared from a similar polyol made in a continuous process, but not using $CO_2$ as a co-reactant.

The invention claimed is:

1. A method of manufacturing a poly(ether-carbonate) polyol, comprising:
a polymerization stage that includes polymerizing carbon dioxide and at least one alkylene oxide, with a starter, in the presence of a double metal cyanide polymerization catalyst and a catalyst promoter that is devoid of halide anions and cyanide, the catalyst promoter being separate from the double metal cyanide polymerization catalyst, wherein the catalyst promoter is selected from the group consisting of:
trialkyl aluminum compounds; aluminum alkoxides; aluminum aryloxides; aluminum amides; aluminum acetylacetonate; aluminum t-butylacetylacetonate; and alkylaluminum oxides and alkoxides.

2. The method as claimed in claim 1, wherein the starter includes at least one selected from a mono-alcohol initiator and a poly-alcohol initiator.

3. The method as claimed in claim 1, wherein in the presence of the double metal cyanide catalyst complex and the catalyst promoter, the carbon dioxide is added intermittently or continuously during the polymerization stage to a reactor and each alkylene oxide of the at least one alkylene oxide is added intermittently or continuously during the polymerization stage to the reactor.

4. The method as claimed in claim 1, further comprising a preliminary stage, prior to the polymerization stage, in which the double metal cyanide catalyst complex, the catalyst promoter, and the starter form a starting reaction mixture.

5. The method as claimed in claim 1, wherein the carbon dioxide and the at least one alkylene oxide are polymerized with the starter to form the poly(ether-carbonate) polyol.

6. The method as claimed in claim 1, wherein the poly(ether-carbonate) polyol is manufactured in a batch or semi-batch process.

7. The method as claimed in claim 1, wherein the poly(ether-carbonate) polyol is manufactured in a continuous process.

* * * * *